United States Patent [19]
Sakoe et al.

[11] 3,816,722
[45] June 11, 1974

[54] COMPUTER FOR CALCULATING THE SIMILARITY BETWEEN PATTERNS AND PATTERN RECOGNITION SYSTEM COMPRISING THE SIMILARITY COMPUTER

[75] Inventors: Hiroaki Sakoe; Seibi Chiba, both of Tokyo, Japan

[73] Assignee: Nippon Electric Company, Limited, Tokyo, Japan

[22] Filed: Sept. 28, 1971

[21] Appl. No.: 184,403

[30] Foreign Application Priority Data

Sept. 29, 1970 Japan ................................ 45-84685
Dec. 21, 1970 Japan ................................ 45-114149
Dec. 29, 1970 Japan ................................ 45-121142

[52] U.S. Cl. ............... 235/152, 179/1 SA, 235/181, 340/146.3 R
[51] Int. Cl. ............................................ G06f 15/34
[58] Field of Search ...... 235/181, 152; 340/146.3 R, 340/146.3 A, 146.3 Q, 146.3 H, 146.3 FT, 146.3 WD, 172.5; 179/1 SA, 1 SB; 444/1

[56] References Cited

UNITED STATES PATENTS

| | | | |
|---|---|---|---|
| 3,196,395 | 7/1965 | Clowes et al. | 340/146.3 H |
| 3,400,216 | 9/1968 | Newman | 179/1 SA |
| 3,413,602 | 11/1968 | Horwitz et al. | 340/146.3 Q |
| 3,462,737 | 8/1969 | Malaby | 340/146.3 H |
| 3,601,802 | 8/1971 | Nakagome et al. | 340/146.3 Q |
| 3,662,115 | 5/1972 | Saito et al. | 179/1 SA |

*Primary Examiner*—Joseph F. Ruggiero
*Attorney, Agent, or Firm*—Sughrue, Rothwell, Mion, Zinn & Macpeak

[57] ABSTRACT

The feature vectors of a sequence representative of a first pattern are correlated to those in another sequence representative of a second pattern in such a manner that the normalized sum of the quantities representative of the similarity between each feature vector of a sequence and at least one feature vector of the other sequence may assume an extremum. The extremum is used as the similarity measure to be calculated between the two patterns. With the pattern recognition system, the similarity measure is calculated for each reference pattern and a variable-length partial pattern to be recognized. The partial pattern is successively recognized to be a permutation with repetitions of reference patterns, each having the maximum similarity measure.

23 Claims, 11 Drawing Figures

COMPUTER FOR CALCULATING THE SIMILARITY BETWEEN PATTERNS AND PATTERN RECOGNITION SYSTEM COMPRISING THE SIMILARITY COMPUTER

BACKGROUND OF THE INVENTION

This invention relates to a computer for calculating the similarity measure between at least two patterns and to a pattern recognition system comprising such a similarity computer. The pattern to which the similarity computer is applicable may be a voice pattern, one or more printed or hand-written letters and/or figures, or any other patterns.

As is known in the art, it is possible to represent a voice pattern or a similar pattern with a sequence of P-dimensional feature vectors. In accordance with the pattern to be represented, the number P may be from one to 10 or more. In a conventional pattern recognition system, such as described in an article of P. Denes and M. V. Mathews entitled "Spoken Digit Recognition Using Time-frequency Pattern Matching" (The Journal of Acoustical Society of America, Vol. 32, No. 11, November 1960) and another article by H. A. Elder entitled "On the Feasibility of Voice Input to an On Line Computer Processing System" (Communication of ACM, Vol. 13, No. 6, June 1970), the pattern matching is applied to the corresponding feature vectors of a reference pattern and of a pattern to be recognized. More particularly, the similarity measure between these patterns is calculated based on the total sum of the quantities representative of the similarity between the respective feature vectors appearing at the corresponding positions in the respective sequences. It is therefore impossible to achieve a reliable result of recognition in those cases where the positions of the feature vectors in one sequence vary relative to the positions of the corresponding feature vectors in another sequence. For example, the speed of utterance of a word often varies as much as 30 percent in practice. The speed variation results in a poor similarity measure even between the voice patterns for the same word spoken by the same person. Furthermore, for a conventional speech recognition system, a series of words must be uttered word by word thereby inconveniencing the speaking person and reducing the speed of utterance. In order to recognize continuous speech, each voice pattern for a word must separately be recognized. However, separation of continuous speech into words by a process called segmentation is not yet well established.

SUMMARY OF THE INVENTION

It is therefore an object of the present invention to provide a computer for calculating the similarity measure between two patterns based on a measure which is never adversely affected by the relative displacement of the corresponding feature vectors in the respective sequences.

Another object of this invention is to provide a pattern recognition system whose performance is never adversely affected by the relative displacement of the corresponding feature vectors.

Still another object of this invention is to provide a speech recognition system capable of recognizing continuous speech.

According to the instant invention, one of the feature vectors of a sequence representative of a pattern is not correlated to one of the feature vectors that appears at the corresponding position in another sequence but each feature vector of the first sequence is correlated to at least one feature vector in the second sequence in such a manner that the normalized sum of the quantities representative of the similarity between the former and the latter may assume an extremum. The extremum is used as the similarity measure to be calculated between the two patterns.

According to an aspect of this invention, the principles of dynamic programming are applied to the calculation of the extremum to raise the speed of operation of the similarity computer.

According to another aspect of this invention, there is provided a pattern recognition system, wherein the similarity measure is calculated for each reference pattern and a variable-length partial pattern to be recognized. The partial pattern is successively recognized to be a permutation with repetitions or concatination of reference patterns, each having the maximum similarity measure.

In accordance with still another aspect of this invention, the correlation coefficient $$r(a_i, b_j) = (a_i, b_j)/\ \sqrt{(a_i, a_i)(b_j, b_j)}, \qquad (1)$$

where $(a_i, b_j)$ and the like in the righthand side represent the scalar products, is used to represent the similarity between the possibly corresponding feature vectors $a_i$ and $b_j$ of the respective sequences. It is, however, to be noted that the correlation coefficient defined above is inconvenient for one-dimensional feature vectors.

In accordance with yet another aspect of this invention, the distance $$d(a_i, b_j) = |a_i - b_j|$$

is used to represent the similarity between the possibly corresponding feature vectors $a_i$ and $b_j$ of the respective sequences.

Incidentally, it is possible to use any other quantity representative of the similarity between the possibly corresponding feature vectors. An example is a modified distance, also denoted by $d(a_i, b_j)$, $$d(a_i,b_j)=\sum_{p=1}^{P} |a_i^p-b_j^p|$$

where $a_i^p$ and $b_j^p$ are the $p$-th components of the possibly corresponding feature vectors $a_i$ and $b_j$, respectively.

When use is made of a quantity representative of the similarity, such as the correlation coefficient mentioned above, which increases with increase in the similarity, calculation of the extremum should be calculation of the maximum. On the contrary, the minimum should be calculated for the extremum when use is made of a quantity representative of the similarity, such as the distance, that decreases with increase in the similarity.

DESCRIPTION OF THE PREFERRED EMBODIMENTS

Figure 1:
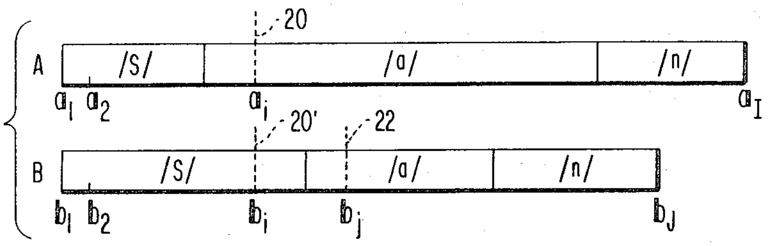
FIG. 1 schematically shows two voice patterns for the same word.
Figure 2:
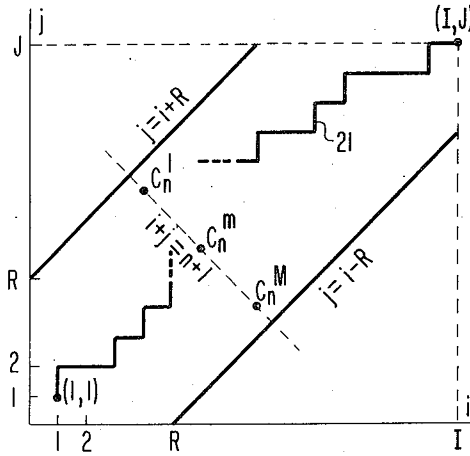
FIGS. 2 and 3 are graphs for explaining the principles of the present invention.
Figure 3:
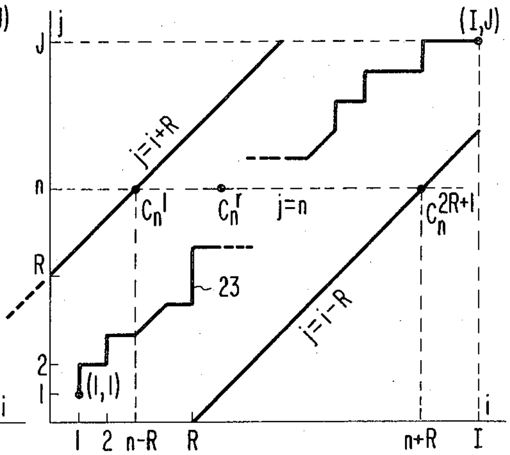

Referring to FIGS. 1 through 3, the principles of a computer for the similarity measure between two given patterns will be described with specific reference to voice patterns.

As mentioned hereinabove, it is possible to represent a voice pattern for a word by a time sequence of P-dimensional feature vectors when the features of pronunciation are suitably extracted. The sequences for two patterns A and B may be given by $A = a_1, a_2, \ldots, a_i, \ldots,$ and $a_I$ and $B = b_1, b_2, \ldots, b_j, \ldots,$ and $b_J$, where $a_i = (a_i^1, a_i^2, \ldots, a_i^p, \ldots, a_i^P)$ and $b_j = (b_j^1, b_j^2, \ldots, b_j^p, \ldots, b_j^P)$, respectively. The components of the vector may be the samples of the outputs, P in number, of a P-channel spectrum analyser sampled at a time point. The vectors $a_i$ and $b_i$ situated at the corresponding time positions in the respective sequences for the same word do not necessarily represent one and the same phoneme, because the speeds of utterance may differ even though the word is spoken by the same person. For example, assume the patterns A and B are both for a series of phonemes /san/ (a Japanese numeral for "three" in English). A vector $a_i$ at a time position 20 represents a phoneme /a/ while another vector $b_i$ at the corresponding time point 20′ represents a different phoneme /s/. The conventional method of calculating the similarity measure between these patterns A and B is to use the summation for $i$ of the correlation coefficients $r(a_i, b_i)$'s given between such vectors $a_i$ and $b_i$ with reference to equation (1). With this measure, the example depicted in FIG. 1 gives only small similarity, which might result in misrecognition of the pattern in question.

Generally, the duration of each phoneme can vary considerably during actual utterance without materially affecting the meaning of the spoken word. It is therefore necessary to use a measure for the pattern matching which will not be affected by the variation. The same applies to the letters printed in various fonts of types, hand-written letters, and the like.

Referring specifically to FIGS. 2 and 3 wherein the sequences of the feature vectors are arranged along the abscissa $i$ and the ordinate $j$, respectively, the combinations of the vectors $a_i$ and $b_j$ will hereafter be represented by $(i, j)$'s. According to the present invention, it is understood that the correspondence exists for a combination $(i, j)$ when the normalized sum for the whole patterns of the correlation coefficients $r(i, j)$'s given by equation (1) assumes a maximum. In other words, the suffixes $i$ and $j$ of the vectors are in correspondence when the arithmetic means value $$(1/K) \sum_{i,j} r(i, j) \qquad (2)$$

becomes maximum, where $K$ is the number of the correlation coefficients summed up from $i = j = 1$ to $i = I$ and $j = J$. The combinations $(i, j)$'s for which a sum is calculated according to formula (2) may, for example, be the combinations represented by the lattice points (points whose coordinates are integers) along a stepwise line 21 exemplified in FIG. 2. According further to this invention, the maximum of various normalized sums given by expression (2) is used as the similarity measure S(A, B) between the patterns A and B. By formula, $$S(A, B) = (1/K) \operatorname{Max} \sum_{i,j} r(i, j) \qquad (3)$$

for which the combinations $(i, j)$'s and the stepwise line for the summation become definite. In this manner, a vector $b_j$ illustrated in FIG. 1 at a time point 22 is definitely correlated to a vector $a_i$. The vector $b_j$ now represents the phoneme /a/. Inasmuch as the similarity measure S(A, B) given by equation (3) is not affected by the relative positions of the vectors in the respective sequences, it is stable as a measure for the pattern matching.

The calculation mentioned above is based on the implicit conditions such that the first combination (1, 1) and the last combination (I, J) are the pairs of the corresponding vectors. The conditions are satisfied for voice patterns for the same word, because the first vectors $a_1$ and $b_1$ represent the same phoneme and so do the last vectors $a_I$ and $b_J$ irrespective of the speed of utterance.

It is to be noted that direct calculation of every correlation coefficients contained in equation (3) requires a vast amount of time and adversely affect the cost and the operation time of the similarity computer to a certain extent. According to this invention, it is found that the dynamic programming is conveniently applicable to the calculation. Thus, calculation of recurrence coefficients or cumulative quantities representative of the similarity $g(a_i, b_j)$'s or $g(i, j)$'s given by $$g(i,j) = r(i,j) + \operatorname{Max} \begin{bmatrix} g(i-1,j) \\ g(i,j-1) \end{bmatrix} \qquad (4)$$

where $$1 \leq i \leq I,\ 1 \leq j \leq J,$$

and $$(i, j) \neq (1, 1),$$

is carried out, starting from the initial condition $$g(1, 1) = r(1, 1)$$

and arriving at the ultimate recurrence coefficient $g(I, J)$ for $i = I$ and $j = J$. It is to be understood that, according to the recurrence formula (4), the ultimate recurrence coefficient $g(I, J)$ is the result of calculation of expression (3) along a particular stepwise line, such as depicted at 21. Inasmuch as the number K of the correlation coefficients summed up to give the ultimate recurrence coefficient $g(I, J)$ is equal to $I + J - 1$ in this case, $$S(A, B) = g(I, J)/(I + J - 1) \qquad (5)$$

gives the similarity measure S(A, B). In addition, it is noteworthy that the speed of pronunciation differs 30 percent at most in practice. The vector $b_j$ which is correlated to a vector $a_i$ is therefore one of the vectors positioned in the neighbourhood of the vector $b_i$. Consequently, it is sufficient to calculate the formula (3) or (4) for the possible correspondences $(i, j)$'s satisfying $$W = \{(i, j) \mid i - R \leq j \leq i + R\}, \qquad (6)$$

which is herein called the normalization window. The integer R may be predetermined to be about 30 percent of the number I or J. Provision of the normalization window given by equation (6) corresponds to restriction of the calculation of formula (3) or (4) or of the stepwise lines within a domain placed between two straight lines $$j = i + R \text{ and } j = i - R,$$

with the boundary inclusive.

With respect to the recurrence formula (4), it should now be pointed out that only two combinations $(i, j + 1)$ and $(i + 1, j)$ are allowed immediately following a combination $(i, j)$. Let vectors $a_i$ and $b_j$ represent a certain phoneme and the next succeeding vectors $a_{i+1}$ and $b_{j+1}$ represent another. In this case, the recurrence formula (4) is somewhat objectionable because it compels to correlate either the vector $a_i$ with the vector $b_{j+1}$ or the vector $a_{i+1}$ with the vector $b_j$ after correlation between the vectors $a_i$ and $b_j$. Instead, it is more desirable to correlate the vector $a_{i+1}$ with the vector $b_{j+1}$ representing the same phoneme immediately following the correlation between the vectors $a_i$ and $b_j$. In order to allow omission of somewhat objectionable correlations, it is preferable to use a modified recurrence formula $$g(i,j) = r(i,j) + \text{Max}\begin{bmatrix} g(i-1, j) \\ g(i, j-1) \\ g(i-1, j-1) + r(i, j) \end{bmatrix} \qquad (7)$$

in place of the unmodified recurrence formula (4). This modified formula allows the maximum to be found along a particular polygonal line 23 exemplified in FIG. 3.

Referring more particularly to FIG. 2, a method called herein the method No. 1 comprises the steps of successively calculating the recurrence formula (4) or (7) for a set of points of an $n$-th stage which lie along a straight line $i + j = n + 1$. With provision of the normalization window, calculation may be carried out for an $n$-th stage from a starting point $C_n^1$ having the smallest $i$ to an end point $C_n^M$ having the greatest $i$ through the intermediate points $C_n^m$'s. The number M of the points in one stage of calculation is approximately equal to $\sqrt{2}(R + 1)$. When the method No. 1 is applied to the modified recurrence formula (7), the recurrence coefficients $g(i, j)$'s of the $n$-th stage are calculated with use of the results of calculation of the recurrence coefficients $g(i - 1, j)$'s and $g(i, j - 1)$'s of the $(n - 1)$-th stage and of the recurrence coefficients $g(i - 1, j - 1)$'s of the $(n - 2)$-th stage. The method No. 1 is thus carried out from the initial point (1, 1) on the first stage to the ultimate point (I, J) on the N-th stage, where $N = I + J - 1$.

Referring more specifically to FIG. 3, a simpler method herein called the method No. 2 comprises the steps of calculating the recurrence formula (4) or (7) for a set of points of an $n$-th stage which lie along a straight line $j = n$. With provision of the normalization window, calculation may be carried out for an $n$-th stage from a starting point $C_j^1$ (suffix $j$ substituted for suffix $n$) having the smallest $i$ to an end point $C_j^{2R+1}$ having the greatest $i$ through the intermediate points $C_j^r$'s. The method No. 2 is thus carried out from the initial point (1, 1) on the first stage to the ultimate point (I, J) on the J-th stage. For the method No. 2, it is preferable to provide the stage of calculation along the straight line $j = n$ or $i = n$ which is parallel to the axis of the $i$–$j$ plane having a greater number of the feature vectors.

Referring more in detail to FIG. 3, the initial point (1, 1) is the $(R + 1)$-th point $C_1^{R+1}$ of the first stage of calculation as counted from the point of the first stage placed on the straight line $j = i + R$, which may be represented by $C_1^1$. The points $C_j^1, \ldots, C_j^r, \ldots,$ and $C_j^{2R+1}$ represent the combinations $(j - R, j), \ldots, (j - R + r - 1, j), \ldots,$ and $(j + R, j)$, respectively. It is consequently possible to derive a rewritten recurrence formula $$g(C_j^r) = r(C_j^r) + \text{Max}\begin{bmatrix} g(C_j^{r-1}) \\ g(C_{j-1}^{r+1}) \\ g(C_{j-1}^r) + r(C_j^r) \end{bmatrix} \qquad (8)$$

and the initial condition $$g(C_1^{R+1}) = r(C_1^{R+1})$$

from the modified recurrence formula (7). Inasmuch as the ultimate point (I, J) is represented by $C_J^{I-J+R+1}$, the similarity measure S(A, B) is given by $$S(A, B) = g(C_J^{I-J+R+1})/(I + J - 1).$$

Figure 4:
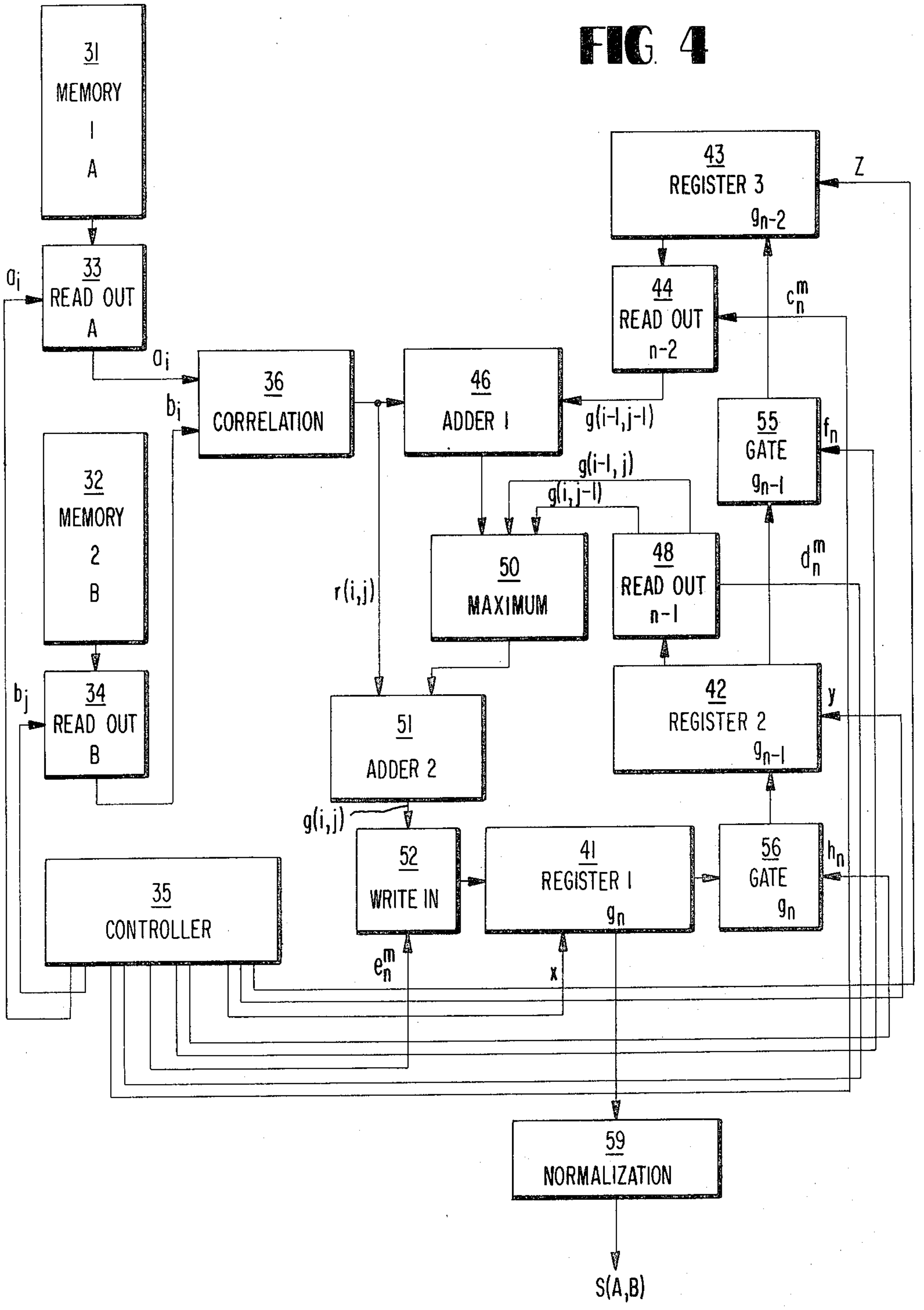
FIG. 4 is a block diagram of a similarity computer according to this invention.

Referring now to FIG. 4, a computer for carrying out the method No. 1 for the modified recurrence formula (7) comprises a first memory 31 for a voice pattern A represented by a sequence of feature vectors $a_i$'s and a second memory 32 for another voice pattern B represented by another sequence of feature vectors $b_j$'s. The memories 31 and 32 are accompanied by A and B pattern read-out devices 33 and 34, respectively. For the sampling period of about 20 ms, the number I or J may be about 20 for the Japanese numeral "san" which has a duration of about 400 ms. It is therefore preferable that each of the memories 31 and 32 has a capacity for scores of the feature vectors. The computer further comprises a controller 35 for various parts of the computer. Supplied with pattern read-out signals $a_i$ and $b_j$ from the controller 35 (here, $i + j = n + 1$), the A and the B pattern read-out devices 33 and 34 supplies the feature vectors $a_i$ and $b_j$ to a correlation unit 36, which calculates a correlation coefficient $r(i, j)$ according to equation (1). The computer still further comprises a first register 41 for storing the recurrence coefficient $g_n$'s of the $n$-th stage derived in the manner later described in compliance with equation (7), a second register 42 for storing the recurrence coefficients $g_{n-1}$'s produced as the results of preceding calculation for the $(n-1)$-th stage, and a third register 43 for the recurrence coefficients $g_{n-2}$'s obtained as the results of still preceding calculation for the $(n-2)$-th stage. Each of the registers 41, 42, and 43 has a capacity sufficient to store the recurrence coefficients $g(i, j)$'s of the related stage. For the members I and J of a spoken numeral, the integer R may be about 10. The third register 43 is accompanied by an $(n-2)$ register read-out device 44 supplied with an $(n-2)$ register read-out signal $c_n^m$ from the controller 35 to deliver the recurrence coefficient $g(i-1, j-1)$ to a first adder 46 supplied with the correlation coefficient $r(i, j)$ for deriving the sum $g(i-1, j-1) + r(i, j)$. The second register 42 is accompanied by an $(n-1)$ register read-out device 48 supplied with an $(n-1)$ register read-out signal $d_n^m$ from the controller 35 to deliver the recurrence coefficients $g(i-1, j)$ and $g(i, j-1)$ to a maximum selecting unit 50 supplied also with the sum for selecting the maximum of $g(i-1, j)$, $g(i, j-1)$, and $g(i-1, j-1) + r(i, j)$. The value of the maximum is supplied together with the correlation coefficient $r(i, j)$ to a second adder 51 for deriving the desired correlation coefficient $g(i, j)$. The resulting recurrence coefficient $g(i, j)$ is supplied to a write-in device 52 responsive to a write-in signal $e_n^m$ supplied from the controller 35 for storing the resulting recurrence coefficient $g(i, j)$ in the first register 41 at the stage specified by the write-in signal $e_n^m$. After completion of calculation of the recurrence coefficients $g(i, j)$'s for the $n$-th stage, the contents of the second and the first registers 42 and 41 are successively transferred to the third and the second registers 43 and 42 through gate circuits 55 and 56, respectively, by $g_{n-1}$ and $g_n$ transfer signals $f_n$ and $h_n$. The computer yet further comprises a normalizing unit 59 for dividing the ultimate recurrence coefficient $g(I, J)$ supplied from the first register 41 after completion of calculation for the N-th stage by $I + J - 1$ to derive the similarity measure $S(A, B)$ in compliance with equation (5). In preparation for operation, the first through the third registers 41, 42, and 43 are supplied with sufficiently small constants C's from the controller 35 through connections $x$, $y$, and $z$, respectively.

In operation for the first stage of calculation, namely, for the initial point (1, 1) in FIG. 2, the first adder 46 is put out of operation by the command supplied thereto from the controller 35 through a connection not shown. In response to the first pattern read-out signals $a_1$ and $b_1$, the correlation unit 36 produces the correlation coefficient $r(1, 1)$. The second adder 51 derives the correlation coefficient $r(1, 1)$ per se as the initial recurrence coefficient $g(1, 1)$ in accordance with the initial condition for the recurrence formula (4). The initial recurrence coefficient $g(1, 1)$ is written in the first register 41 in response to the write-in signal $e_1^1$ and then transferred to the second register 42 in response to the first $g_n$ transfer signal $h_1$ produced after the first $g_{n-1}$ transfer signal $f_1$ which does not cause any change in the third register 43.

In operation for the second stage of calculation, namely, for points $C_2^1$ (1, 2) and $C_2^2$ (2, 1), finite recurrence coefficients $g(i-1, j)$ and $g(i-1, j-1)$ and another set of finite recurrence coefficients $g(i, j-1)$ and $g(i-1, j-1)$ are not yet present. Three finite recurrence coefficients are supplied to the maximum selecting unit 50 for the first time for the second point of the third stage $C_3^2$.

In operation for the $n$-th stage of calculation where $n$ is greater than R and smaller than $2J - R$, (I is assumed greater than J) namely, for points $C_n^1, \ldots, C_n^m, \ldots$, and $C_n^M$, let the correlation coefficient $r(i, j)$ and the recurrence coefficient $g(i, j)$ for a point $C_n^m$ be represented by $r(C_n^m)$ and $g(C_n^m)$, respectively. At the end of the previous calculation for the $(n-1)$-th stage, the second and the third registers 42 and 43 are supplied with the recurrence coefficients $g(C_{n-1}^1)$, $g(C_{n-1}^2), \ldots, g(C_{n-1}^m), \ldots$, and $g(C_{n-1}^M)$ of the $(n-1)$-th stage and the recurrence coefficients $g(C_{n-2}^1)$, $g(C_{n-2}^2), \ldots, g(C_{n-2}^m), \ldots$, and $g(C_{n-2}^M)$ of the $(n-2)$-th stage, respectively. In this connection, it should be pointed out that, although the same symbol M is used for the $n$-th and the $(n-1)$-th stages, these numbers M's differ by one and that, when $n - R$ is an even integer, the recurrence coefficients $g(i-1, j)$ for the point $C_n^1$ and $g(i, j-1)$ for the point $C_n^M$ are not finite because the points $C_{n-1}^1$ and $C_{n-1}^M$ represent combinations $(i, j-1)$ and $(i-1, j)$ rather than the combinations $(i-1, j)$ and $(i, j-1)$, respectively. At any rate, the coordinates of the starting and the end points of the calculation for the $n$-th stage are described by $(i_s, j_s)$ and $(i_e, j_e)$, respectively, for the present. In case $n - R$ is an odd integer, the abscissae $i_s$ and $i_e$ are equal to $(n - R + 1)/2$ and $(n + R + 1)/2$, respectively. In case $n - R$ is an even integer, the abscissae are equal to $(n - R)/2 + 1$ and $(n + R)/2$, respectively. In response to the first pattern read-out signals $a_{i.s}$ and $b_{j.s}$ of the $n$-th stage, the correlation unit 36 produces the correlation coefficient $r(C_n^1)$. It is noted that the suffixes $i{\cdot}s$ and $j{\cdot}s$ represent the double suffixes $i_s$ and $j_s$, respectively. In response to the first register read-out signals $d_n^1$ and $c_n^1$ of the $n$-th stage produced immediately subsequently to the above-mentioned control signals $a_{i.s}$ and $b_{j.s}$, the recurrence coefficients $g(C_{n-1}^1)$, $g(C_{n-1}^2)$, and $g(C_{n-2}^1)$, or a sufficiently small constant C and the recurrence coefficients $g(C_{n-1}^1)$ and $g(C_{n-2}^1)$ are selected to make the second adder 51 produce the first recurrence coefficients $g(C_n^1)$ of the $n$-th stage, which is put in the pertinent position in the first register 41 by the first write-in signal $e_n^1$ of the $n$-th stage produced immediately following the control signals $c_n^1$ and $d_n^1$. For the $m$-th point $C_n^m$, the coordinates are $i_s + m - 1$ and $j_s - m + 1$, respectively. In response to the $m$-th pattern read-out signals $a_{i.s+m-1}$ and $b_{j.s-m+1}$ of the $n$-th stage, the correlation unit 36 derives the correlation coefficient $r(C_n^m)$. In response to the $m$-th register read-out signals $d_n^m$ and $c_n^m$ produced after the last-mentioned pattern read-out signals, either the recurrence coefficients $g(C_{n-1}^m)$, $g(C_{n-1}^{m+1})$, and $g(C_{n-2}^m)$ or $g(C_{n-1}^{m-1})$, $g(C_{n-1}^m)$ and $g(C_{n-2}^m)$ are selected to cause the second adder 51 to derive the $m$-th recurrence coefficient $g(C_n^m)$ of the $n$-th stage, which is written into the pertinent position in the first register 41 in response to the $m$-th write-in signal $e_n^m$ of the $n$-th stage produced immediately after the above-mentioned register read-out signals. In this manner, the M-th pattern read-out signals $a_{i.e}$ and $b_{j.e}$, the M-th register read-out signals $d_n^M$ and $c_n^M$, and the M-th write-in signal $e_n^M$ of the $n$-th stage are successively produced to place, using the recurrence coefficients $g(C_{n-1}^{M-1})$, $g(C_{n-1}^{M})$, and $g(C_{n-2}^{M})$ or the recurrence coefficient $g(C_{n-1}^{M})$, the sufficiently small constant C, and the recurrence coefficient $g(C_{n-2}^{M})$, the M-th recurrence coefficient $g(C_{n}^{M})$ of the $n$-th stage in the pertinent stage of the first register 41. The $g_{n-1}$ transfer signal $f_n$ now transfers the contents of the second register 42 to the third register 43. Subsequently, the $g_n$ transfer signal $h_n$ transfers the contents of the first register 41 to the second register 42.

Eventually, the N-th stage pattern read-out signals $a_I$ and $b_J$, the N-th stage register read-out signals $d_N^1$ and $c_N^1$, and the N-th stage write-in signal $e_N^1$ are successively produced to write the ultimate recurrence coefficient $g(C_N^1)$ or $g(I, J)$ in the first register 41. The ultimate recurrence coefficient is subsequently normalized at the normalizing unit 59 to give the similarity measure S(A, B).

It is believed that the components of the similarity computer illustrated with reference to FIG. 4 are known in the art. Some thereof, however, will be described more in detail hereunder. Furthermore, it is easy for those skilled in the art to formulate a program for making the controller 35 produce the control signals mentioned above. Still further, the similarity computer is easily modified into one for calculating the similarity measure based on such quantities representative of the similarity between the possibly corresponding feature vectors as may decrease with increase in the similarity. The modification comprises a pertinent similarity calculator, such as a distance calculator, and a minimum selecting unit in place of the correlation unit 36 and the maximum selecting unit 50, respectively. For the modification, a sufficiently large constant is substituted for that recurrence coefficient on selecting the minimum of the three recurrence coefficients which is not defined. It is easy to design a distance or a modified distance calculator by modifying the correlation unit 36 of any type and to design a minimum selecting unit by modifying the maximum selecting unit 50. It is also easy to modify the similarity computer into those for carrying out the method No. 1 for the unmodified recurrence formula (4). The modification need not comprise the third register 43, the $(n-2)$ register read-out device 44, the first adder 46, the gate circuit 55 for the inputs to the third register 43, and the related components.

Figure 5:
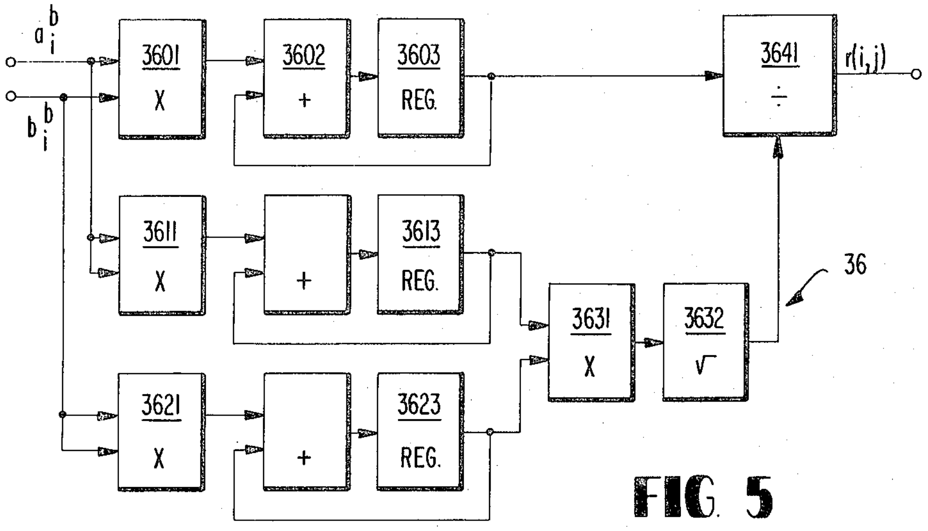
FIG. 5 is a block diagram of a correlation unit used in a similarity computer according to this invention.

Referring to FIG. 5, a correlation unit 36 of the serial type comprises a multiplier 3601 for the numerator of equation (1) to which the vector component pairs $a_i^p$ and $b_j^p$ are successively supplied starting with, for example, the first component pair $a_i^1$ and $b_j^1$. The product $a_i^p \cdot b_j^p$ is supplied to an adder 3602 for deriving the sum of the product and the content of a register 3603, to which the sum is fed back. It follows therefore that, when all components of a pair of vectors $a_i$ and $b_j$ are supplied to the correlation unit 36, the numerator register 3603 produces the scalar product $(a_i, b_j)$ of the numerator of equation (1). The correlation unit 36 further comprises another multiplier 3611 for the first factor in the denominator, which is successively supplied with the components $a_i^p$ of the vector $a_i$. The square $(a_i^p)^2$ is similarly processed so that a first register 3613 may produce the first scalar product $(a_i, a_i)$. Still another multiplier 3621 for the second factor is successively supplied with the components $b_j^p$ of the vector $b_j$. The square $(b_j^p)^2$ is likewise processed to appear eventually at the output terminal of a second register 3623 as the second scalar product $(b_j, b_j)$. The first and the second scalar products $(a_i, a_i)$ and $(b_j, b_j)$ are supplied to a fourth multiplier 3631 and then to a square root calculator 3632, which now gives the denominator of equation (1). The correlation unit 36 still further comprises a divider 3641, responsive to the outputs of the numerator register 3603 and the square root calculator 3632, for dividing the former by the latter to produce the correlation coefficient $r(i, j)$. With this series type correlation unit, it is necessary to supply the output of the divider 3641 to the adders 46 and 51 of FIG. 4 through a gate (not shown) which is opened by control pulses supplied from the controller 35 through a connection (not shown) simultaneously with the register read-out signals $c$ and $d$.

With this correlation unit illustrated in conjunction with FIG. 5, it is easily understood that each pattern read-out signal $a_i$ or $b_j$ should successively designate for read out the components, P in number, of each vector stored in the memory 31 or 32. In addition, it is appreciated that the correlation unit 36 may be of various other types. For example, the vector component pairs $a_i^p$ and $b_j^p$ may be supplied in parallel to a plurality of multipliers, P in number, from the memories 31 and 32 to derive the respective products $a_i^p \cdot b_j^p$'s, which are supplied to an adder to derive the scalar product $(a_i, b_j)$ used in the numerator of equation (1).

Figure 6:
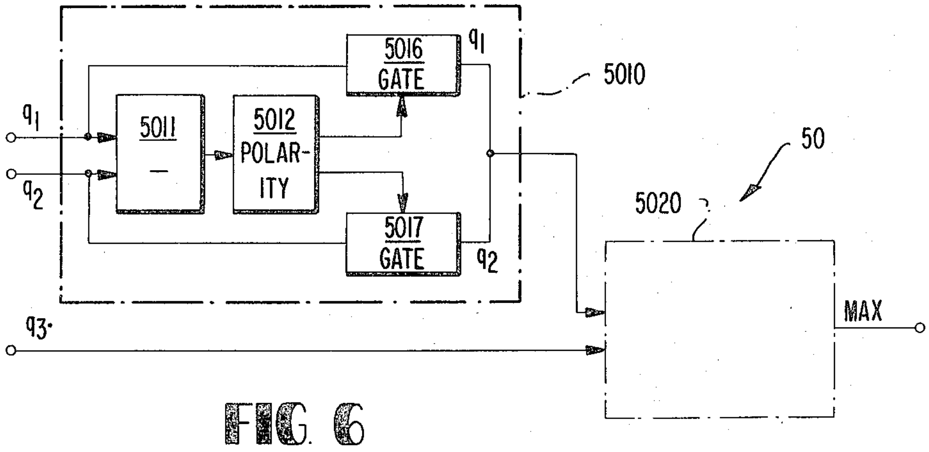
FIG. 6 is a block diagram of a maximum selecting unit used in a similarity computer according to this invention.

Referring to FIG. 6, a maximum selecting unit 50 comprises a first stage 5010 comprising in turn a subtractor 5011, responsive to two input signals $q_1$ and $q_2$, for producing the difference $q_1 - q_2$. The difference is supplied to a polarity discriminator 5012 which produces a first and a second gate signal at two output terminals thereof, respectively. The first gate signal is supplied to a first normally closed gate circuit 5016 to open the same for the first input signal $q_1$ when the difference is positive. Similarly, the second gate signal opens a second normally closed gate circuit 5017 for the second input signal $q_2$ when the difference is negative. Either output signal of the gate circuits 5016 and 5017 and a third input signal $q_3$ are supplied to a second stage 5020 of the like construction. The maximum selection unit 50 thus selects the maximum of the three input signals $q_1$, $q_2$, and $q_3$.

Figure 7:
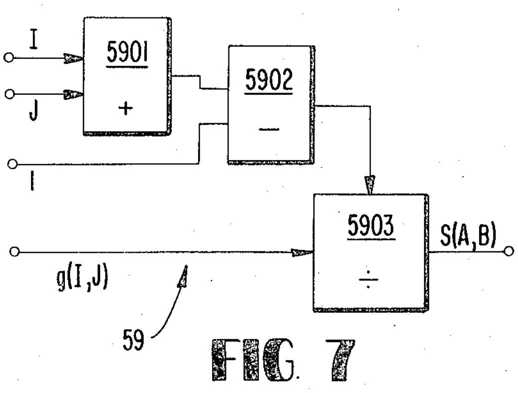
FIG. 7 is a block diagram of a normalizing unit used in a similarity computer according to this invention.

Referring to FIG. 7, a normalizing unit 59 comprises an adder 5901 to which the numbers I and J are supplied from the controller 35 of FIG. 4 through a connection (not shown) in timed relation to other control signals. The sum I + J is supplied to a subtractor 5902 for subtracting unity from the sum to derive the algebraic sum I + J − 1, which is supplied to a divider 5903 as the divisor for the ultimate recurrence coefficient $g(I, J)$ also supplied thereto. The normalizing unit 59 thus produces the similarity measure S(A, B).

Figure 8:
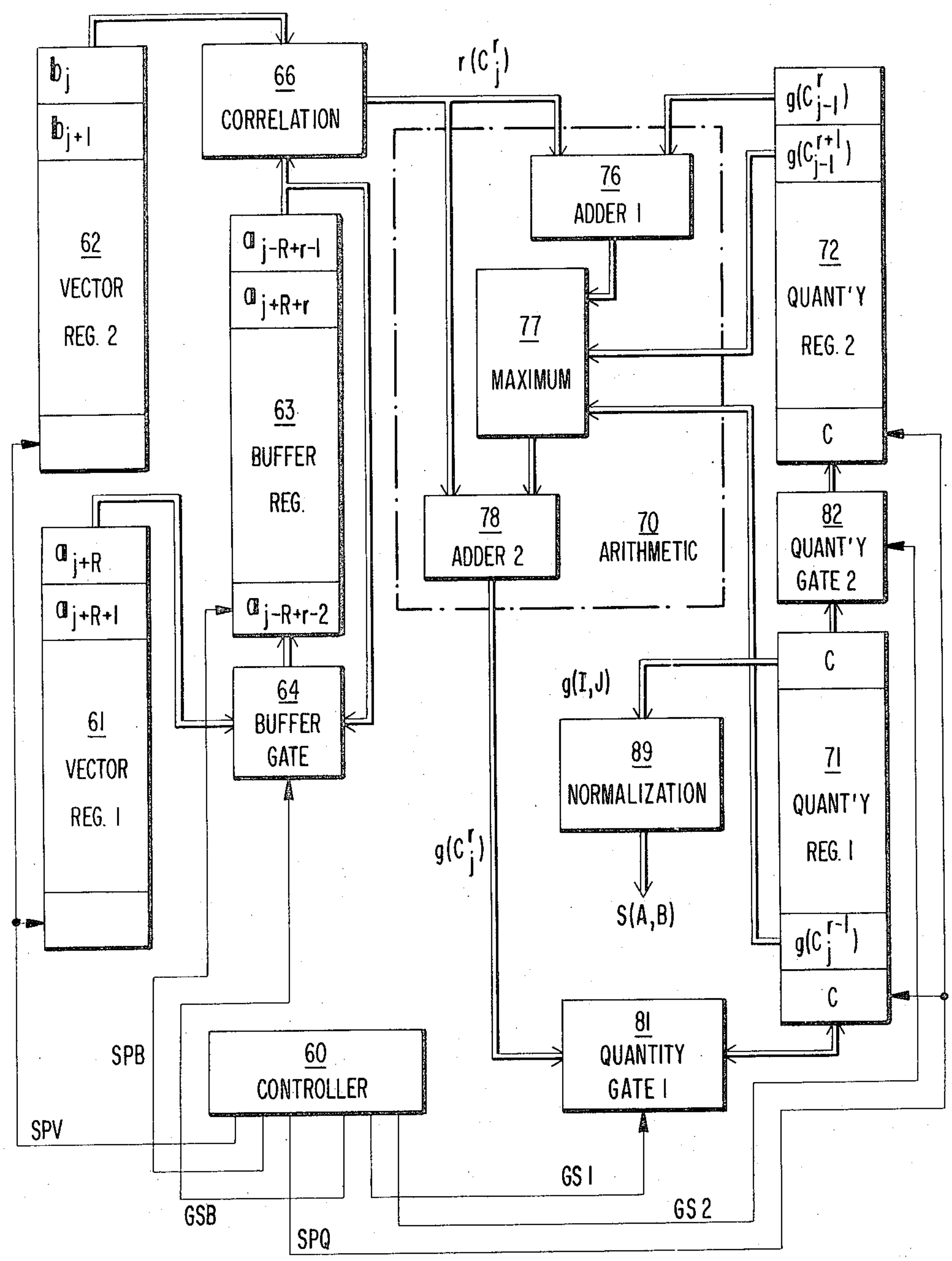
FIG. 8 is a block diagram of another preferred embodiment of a similarity computer according to this invention.

Referring to FIG. 8, a computer for carrying out the method No. 2 for the modified recurrence formula (7) or (8) comprises a controller 60 for producing various shift pulse series SP, various gate signals GS, and the commands (not shown) for various arithmetic operations. The computer further comprises a first vector shift register 61 of at least I stages and a second vector shift register 62 of at least J stages supplied with pulses of vector shift pulse series SPV and a buffer register 63 of 2R + 1 stages supplied with pulses of buffer shift pulse series SPB. It can be seen from FIG. 3 that the number of points along any horizontal line, i.e. $j$=constant, between the two boundary conditions is equal to 2R + 1. The buffer register 63 is accompanied by a buffer gate circuit 64 supplied with a buffer gate signal GSB. So long as the gate signal GSB is logical "0," the buffer shift pulses SPB cyclically shift the contents of the buffer register 63. When the gate signal GSB is temporarily turned to logical "1," the content in the last stage (counted from the bottom stage in the drawing) of the first vector register 61 is substituted for the content in the first stage of the buffer register 63. It may be assumed that the $(j+R)$-th and the $j$-th feature vectors $a_{j+R}$ and $b_j$ are present in the last stages of the vector registers 61 and 62, respectively, and that the buffer gate signal GSB is kept at logical "0" to make the buffer shift pulses SPB successively place the $(j-R+r-1)$-th vectors $a_{j-R+r-1}$'s ($r=1, 2, \ldots,$ and $2R+1$) for the pattern A in the last stage of the buffer register 63. Supplied with the contents in the last stages of the second vector register 62 and the buffer register 63, a correlation unit 66 successively calculates the correlation coefficients $r(C_j^r)$'s in accordance with equation (1) and supplies the same to an arithmetic unit 70. The computer still further comprises a first quantity shift register 71 and a second quantity shift register 72, each of which is of $2R+2$ stages and supplied with pulses of quantity shift pulse series SPQ produced in timed relation to the corresponding buffer shift pulses SPB. When the $(j-R+r-1)$-th vector $a_{j-R+r-1}$ is present in the last stage of the buffer register 63 under the circumstances assumed, recurrence coefficients $g(C_j^{r-1})$, $g(C_{j-1}^{r+1})$ and $g(C_{j-1}^{r})$ are present in the second stage of the first quantity register 71 and the $(2R+1)$-th and the $(2R+2)$-th stages of the second quantity register 72, respectively. The arithmetic unit 70 comprises a first adder 76 supplied with the contents in the correlation unit 66 and in the last stage of the second quantity register 72 to produce the sum $r(C_j^r)+g(C_{j-1}^r)$, a maximum selecting unit 77 supplied with the contents in the second stage of the first quantity register 71, in the $(2R+1)$-th stage of the second quantity register 72, and in the first adder 76 to derive the maximum of $g(C_j^{r-1})$, $g(C_{j-1}^{r+1})$, and $g(C_{j-1}^r)+r(C_j^r)$, and a second adder 78 supplied with the contents of the correlation unit 66 and the maximum selecting unit 77 for deriving the sum of $r(C_j^r)$ and the maximum. The output of the arithmetic unit 70 is a recurrence coefficient $g(C_j^r)$, which is supplied to a first quantity gate circuit 81. The content of the last stage of the first quantity register 71 is supplied to a second quantity gate circuit 82. When a first quantity gate signal GS1 is momentarily turned to logical "1," the content of the first quantity gate circuit 81 is substituted for the content in the first stage of the first quantity register 71. While a second quantity gate signal GS2 is logical "1," the content in the last stage of the first quantity register 71 is substituted for the content in the first stage of the second quantity register 72. While the quantity gate signals GS1 and GS2 are logical "0," each pulse of the quantity shift pulse series SPQ writes a sufficiently small constant C in each first stage of the quantity registers 71 and 72. The constants C's serve to exclude the points situated outside of the normalization window from calculation of the recurrence formula (7) or (8). The content of the last stage of the first quantity register 71 is further supplied to a normalization unit 89 for deriving the similarity measure S(A, B) given by equation (5) in response to a control signal supplied from the controller 60 through a connection not shown. For voice patterns, it is possible to calculate the similarity measure within 100 ms, with the repetition frequency of the buffer and the quantity shift pulses SBP and SPQ of the order of several kilohertzes. In this connection, it is to be noted that conventional circuit components serve well to calculate the similarity measure within about one microsecond for the patterns, each represented by about twenty feature vectors, each having about 10 components, and with the integer R of about 10.

In order to prepare for operation, the vector and the buffer registers 61, 62 and 63 are supplied with the feature vectors $a_{R+1}, a_{R+2}, \ldots, a_I, c, \ldots,$ and $c$, $b_1, b_2, \ldots,$ and $b_J$, and $c, c, \ldots, c, a_1, \ldots,$ and $a_R$, respectively, where $c$ represents a sufficiently small vector. The operation of the arithmetic unit 70 is inhibited by the commands at first. With the quantity gate signals GS1 and GS2 kept at logical "0," quantity shift pulses, $2R+2$ in number, are produced to place the sufficiently small constants C's in each stage of the quantity registers 71 and 72.

In operation for the first stage of calculation, the commands are supplied to the arithmetic unit 70 such that the first adder 76 may produce the content of the last stage of the second quantity register 72 without adding thereto the correlation coefficient derived from the correlation unit 66. Furthermore, the gate signals GSB, GS1, and GS2 are kept at logical "0." A first buffer shift pulse SPB is produced to shift the contents of the buffer register 63 by one stage. Substantially simultaneously, a first quantity shift pulse SPQ is produced to shift the contents of the first and the second quantity registers 71 and 72, with addition of a sufficiently small constant C to each first stage thereof. The correlation unit 66 derives the correlation coefficient between the first vector $b_1$ for the pattern B and the sufficiently small vector $c$ in the respective last stages of the second vector and the buffer registers 62 and 63. Meanwhile, the buffer gate signal GSB is temporarily turned to logical "1" to place the $(R+1)$-th vector $a_{R+1}$ for the pattern A in the first stage of the buffer register 63. When the first quantity gate signal GS1 is momentarily turned to logical "1," a sufficiently small constant C produced by the arithmetic unit 70 is written in the first stage of the first quantity register 71. Until production of the R-th buffer and quantity shift pulses SPB and SPQ, the arithmetic unit 70 produces the constants C's which are successively written in the first stage of the first quantity register 71 when the first quantity gate signal GS1 is momentarily turned to logical "1" after production of each pair of the buffer and the quantity shift pulses SPB and SPQ. The $(R+1)$-th buffer shift pulse SPB places the first vector $a_1$ for the pattern A in the last stage of the buffer register 63. Consequently, the correlation unit 66 produces a first significant correlation coefficient $r(C_1^{R+1})$ of the first stage to make the arithmetic unit 70 produce the initial recurrence coefficient $g(C_1^{R+1})$ which is in accordance with the initial condition for the recurrence formula (7) or (8) and is written in the first stage of the first quantity register 71 when the first quantity gate signal GS1 is momentarily turned to logical "1." In accordance with equation $$g(C_1^{r+1}) = g(C_1^{r}) + r(C_1^{r+1})$$

and in response to the (R + 2)-th buffer and quantity shift pulses SPB and SPQ, the arithmetic unit 70 produces a second recurrence coefficient $g(C_1^{r+2})$ of the first stage, which is now substituted for the constant C in the first stage of the first quantity register 71 when the first quantity gate signal GS1 is momentarily turned to logical "1." The (2R + 1)-th buffer and quantity shift pulses SPB and SPQ eventually make the arithmetic unit 70 produce the (R + 1)-th or the last recurrence coefficient $g(C_1^{2R+1})$ of the first stage. After the last recurrence coefficient is written into the first quantity register 71, the contents of the buffer and the first and the second quantity registers 63, 71, and 72 are $a_{R+1}, c, \ldots, c, a_1, \ldots,$ and $a_R$,
C, . . . , C, $g(C_1^{R+1})$, . . . , and $g(C_1^{2R+1})$,
and
C, C, . . . , and C,
respectively.

In preparation for the second stage of calculation, the arithmetic unit 70 is put into full operation. It is to be noted that the arithmetic unit 70 may be fully operated when it has produced the initial recurrence coefficient $g(C_1^{R+1})$. The first and the second quantity gate signals GS1 and GS2 are kept at logical "0" and "1," respectively. With quantity shift pulses SPQ, 2R + 2 in number, the contents of the first and the second quantity registers 71 and 72 are changed to C, C, . . . , and C
and
C, . . . , C, $g(C_1^{R+1})$, . . . , and $g(C_1^{2R+1})$,
respectively. The second quantity gate signal GS2 is returned to logical "0."

In operation for the second stage, a vector shift pulse SPV is produced to shift the next succeeding vectors $a_{R+2}$ and $b_2$ to the respective last stages of the vector registers 61 and 62. The first buffer shift pulse SPB is produced to cyclically shift the contents of the buffer register 62 by one stage. Substantially simultaneously, the first quantity shift pulse SPQ is produced to shift the contents of the quantity shift registers 71 and 72 by one stage each and to place the constant C in each first stage thereof. Meanwhile, the buffer gate signal GSB is temporarily turned to logical "1" to place the (R + 2)-th vector $a_{R+2}$ for the pattern A in the first stage of the buffer register 63. Inasmuch as a sufficiently small constant C is produced by the arithmetic unit 70, the momentary change of the first quantity gate signal GS1 to logical "1" does not change the contents of the first quantity register 71 in effect. The R-th buffer and quantity shift pulses SPB and SPQ eventually place the first vector $a_1$, a sufficiently small constant C, the initial recurrence coefficient $g(C_1^{R+1})$, and another sufficiently small constant C in the last stage of the buffer register 63, the second stage of the first quantity register 71, and the (2R + 1)-th and the last stages of the second quantity register 72, respectively. The arithmetic unit 70 therefore produces a first significant recurrence coefficient $g(C_2^{R})$ of the second stage, which is substituted for the constant C in the first stage of the first quantity register 71 upon the momentary change to logical "1" of the first quantity gate signal GS1. The (R + 1)-th buffer and quantity shift pulses SPB and SPQ similarly produce the second recurrence coefficient $g(C_2^{R+1})$ of the second stage in response to the variables $a_2$, $b_2$, $g(C_2^{R})$, $g(C_1^{R+2})$, and $g(C_1^{R+1})$. The (2R + 1)-th quantity shift pulse SPQ produced together with the corresponding buffer shift pulse SPB places the last recurrence coefficient $g(C_1^{2R+1})$ and a sufficiently small constant C in the last and the (2R + 1)-th stages of the first quantity register 71, respectively. After the last recurrence coefficient $g(C_2^{2R+1})$ of the second stage is substituted for the constant C in the first stage of the first quantity register 71, the contents of the buffer and the first and the second quantity registers 63, 71, and 72 are $a_{R+2}, c, \ldots, c, a_1, \ldots,$ and $a_{R+1}$,
C, . . . , C, $g(C_2^{R})$, . . . , and $g(C_2^{2R+1})$,
and
C, C, . . . , and C,
respectively.

In operation for the $j$-th stage of calculation, where $j$ is not smaller than R + 1, the contents of the buffer and the first and the second quantity registers 63, 71, and 72 are at first $a_{j-R-1}, a_{j-R}, \ldots,$ and $a_{j+R-1}$,
C, C, . . . , and C,
and
C, $g(C_{j-1}^{1})$, . . . , and $g(C_{j-1}^{2R+1})$,
respectively. A vector shift pulse SPV is produced to shift the $(j + R)$-th vector $a_{j+R}$ and the $j$-th vector $b_j$ in the respective last stages of the first and the second vector registers 61 and 62. The first buffer shift pulse SPB cyclically shifts the contents of the buffer register 63 by one stage. Substantially simultaneously, the first quantity shift pulse SPQ shifts the contents of the first and the second quantity registers 71 and 72 by one stage each and places the contant C in each first stage thereof. The correlation unit 66 derives the correlation coefficient $r(C_j^{1})$ between the $j$-th vector $b_j$ for the pattern B and the $(j - R)$-th vector $a_{j-R}$ for the pattern A which are present in the respective last stages of the second vector and the buffer registers 62 and 63. In response to the correlation coefficient $r(C_j^{1})$, the constant C in the second stage of the first quantity register 71, and the recurrence coefficients $g(C_{j-1}^{2})$ and $g(C_{j-1}^{1})$ in the respective (2R + 1)-th and last stages of the second quantity register 72, the arithmetic unit 70 derives the first recurrence coefficient $g(C_j^{1})$ of the $j$-th stage, which is substituted for the constant C in the first stage of the first quantity register 71 when the first quantity gate signal GS1 is momentarily turned to logical "1." Meanwhile, the buffer gate signal GSB is temporarily turned to logical "1" to substitute the $(j + R)$-th vector $a_{j+R}$ for the pattern A for the $(j - R - 1)$-th vector $a_{j-R-1}$ now placed in the first stage of the buffer register 63. When the (2R + 1)-th buffer and quantity shift pulses SPB and SPQ are produced, the contents of the buffer and the first and the second quantity registers 63, 71, and 72 become $a_{j+R}, a_{j-R}, \ldots,$ and $a_{j+R-1}$,
C, $g(C_j^{1})$, . . . , $g(C_j^{2R})$, and C,
and
$g(C_{j-1}^{2R+1})$, C, . . . , and C,
respectively. Responsive to the correlation coefficient $r(C_j^{2R+1})$ between the $j$-th vector $b_j$ for the pattern B and the $(j + R)$-th vector $a_{j+R}$ for the pattern A, the recurrence coefficient $g(C_j^{2R})$ in the second stage of the first quantity register 71, and the constant C and the recurrence coefficient $g(C_{j-1}^{2R+1})$ in the (2R + 1)-th and the last stages of the second quantity register 72, the arithmetic unit 70 produces the last recurrence coefficient $g(C_j^{2R+1})$ of the $j$-th stage, which is substituted for the constant C in the first stage of the first quantity register 71 by the first quantity gate signal GS1 momentarily turned to logical "1." The contents of the buffer and the first and the second quantity registers 63, 71, and 72 are now $a_{j+R}, a_{j-R}, \ldots$, and $a_{j+R-1}$,
C, $g(C_j^1), \ldots, g(C_j^{2R})$, and $g(C_j^{2R+1})$,
and
$g(C_{j-1}^{2R+1})$, C, . . . , and C, respectively.

In preparation for the calculation of the $(j+1)$-th stage, quantity shift pulses SPQ, 2R + 2 in number, are produced with the first and the second quantity gate signals GS1 and GS2 kept at logical "0" and "1," respectively. The second quantity gate signal GS2 is subsequently returned to logical "0."

When the operation reaches the (I − R + 1)-th stage, the vectors $a_I, c, \ldots$, and $c$
and
$a_{I-2R}, a_{I-2R+1}, \ldots$, and $a_I$ for the pattern A are contained in the respective stages of the buffer register 63. A vector shift pulse SPV is produced to shift the sufficiently small vector $c$ and the (I − R + 1)-th vector $b_{I-R+1}$ in the respective last stages of the first and the second vector registers 61 and 62. The first buffer shift pulse SPB cyclically shifts the contents by one stage. At the substantially same time, the first quantity shift pulse SPQ shifts the contents of the first and the second quantity registers 71 and 72 by one stage each and places the constant C in each first stage thereof. In compliance with the correlation coefficient $r(C_{I-R+1}^1)$ between the (I − R + 1)-th vector $b_{I-R+1}$ for the pattern B and the (I − 2R + 1)-th vector $a_{I-2R+1}$ for the pattern A, the constant C in the second stage of the first quantity register 71, and the recurrence coefficients $g(C_{I-R}^2)$ and $g(C_{I-R}^1)$ in the respective (2R + 1)-th and last stages of the second quantity register 72, the arithmetic unit 70 produces the first recurrence coefficient $g(C_{I-R+1}^1)$ of the (I − R + 1)-th stage, which is substituted for the constant C in the first stage of the first quantity register 71 when the first quantity gate signal GS1 is momentarily turned to logical "1." Meanwhile, the buffer gate signal GSB is temporarily turned to logical "1" to substitute the sufficiently small vector $c$ now placed in the last stage of the first vector register 61 for the (I − 2R)-th vector $a_{I-2R}$ for the pattern A in the first stage of the buffer register 63. When the first quantity gate signal GS1 is turned to logical "1" after the eventual production of the 2R-th buffer and quantity shift pulses SPB and SPQ, the last recurrence coefficient $g(C_{I-R+1}^{2R})$ is substituted for the constant C in the first stage of the first quantity register 71. The following (2R + 1)-th buffer and quantity shift pulses SPB and SPQ place the vectors $$c, a_{I-2R+1}, \ldots, \text{and } a_I$$

for the pattern A in the respective stages of the buffer register 63. It follows therefore that, even when the first quantity gate signal GS1 is turned to logical "1," change does not occur in effect in the contents of the first quantity register 71. The contents of the buffer and the first and the second quantity registers 63, 71, and 72 are now $c, a_{I-2R+1}, \ldots$, and $a_I$,
C, $g(C_{I-R+1}^1), \ldots, g(C_{I-R+1}^{2R})$, and C,
and
C, C, . . . , and C, respectively.

For the (I − R + 2)-th through the (J − 1)-th stages of calculation, the respective last recurrence coefficients are $g(C_{I-R+2}^{2R-1})$ through $g(C_{J-1}^{I-J+R+2})$. It is therefore understood that, in preparation for the J-th or last stage of calculation, the contents $a_{J-R-1}, \ldots, a_I, c, \ldots$, and $c$,
C, C, . . . , and C,
and
C, $g(C_{J-1}^1), \ldots, g(C_{J-1}^{I-J+R+2})$, C, . . . , and C are placed in the buffer and the first and the second quantity registers 63, 71, and 72, respectively.

In operation for the last stage of calculation, the vector shift pulse SPV places the last vector $b_J$ for the pattern B in the last stage of the second vector register 62. The first buffer and quantity shift pulses SPB and SPQ make the arithmetic unit 70 produce the first recurrence coefficient $g(C_J^1)$, which is substituted for the constant C in the first stage of the first quantity register 71 in response to the momentary turning to logical "1" of the first quantity gate signal GS1. Meanwhile, the buffer gate signal GSB is turned to logical "1" to substitute a sufficiently small vector $c$ for the (J − R − 1)-th vector $a_{J-R-1}$ for the pattern A in the first stage of the buffer register 63. Eventually, the (I − J + R + 1)-th buffer and quantity shift pulses SPB and SPQ place the I-th vector $a_I$ for the pattern A, the constants and the recurrence coefficients C, . . . , C, $g(C_J^1), \ldots, g(C_J^{I-J+R})$, and C, and the recurrence coefficients and the constants $g(C_{J-1}^{I-J+R+1})$, $g(C_{J-1}^{I-J+R+2})$, C, . . . , and C in the last stage of the buffer register 63, in the respective stages of the first quantity register 71, and in the last through the first stages of the second quantity register 72, respectively. The (I − R + J + 1)-th or last recurrence coefficient $g(C_J^{I-R+J+1})$ of the last stage of calculation or the ultimate recurrence coefficient $g(I, J)$ is produced and then substituted for the constant C in the first stage of the first quantity register 71 by the momentary turning to logical "1" of the first quantity gate signal GS1. The (I − J + R + 2)-th and the following pairs of the buffer and the quantity shift pulses SPB and SPQ make the arithmetic unit 70 produce only the sufficiently small constants C's. After production of the (2R + 1)-th buffer and quantity shift pulses SPB and SPQ, the contents of the buffer and the first and the second quantity registers 63, 71, and 72 are $c, a_{J-R}, \ldots, a_I, c, \ldots$, and $c$,
C, $g(C_J^1), \ldots, g(C_J^{I-J+R+1})$, C, . . . , and C,
and
C, C, . . . , and C, respectively.

Subsequently, quantity shift pulses SPQ, I − J + R + 1 in number, are produced to shift the ultimate recurrence coefficient $g(C_J^{I-J+R+1})$ or $g(I, J)$ in the last stage of the first quantity register 71.

Figure 9:
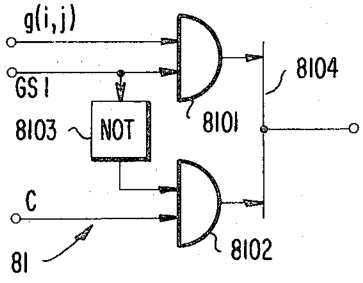
FIG. 9 is a block diagram of a gate circuit used in the similarity computer shown in FIG. 8.

Referring to FIG. 9, the first quantity gate circuit 81 comprises a first AND gate 8101 supplied with the first quantity gate signal GS1 and the recurrence coefficient $g(i, j)$ produced from the arithemtic unit 70, a second AND gate 8102 supplied with sufficiently negative voltage C and, through a NOT circuit 8103, the first quantity gate signal GS1, and an OR gate 8104 supplied with the output signals of the AND gates 8101 and 8102 to produce the input signal to the first quantity register 71. For the second quantity gate circuit 82 of the same construction, the second quantity gate signal GS2 and the content in the last stage of the first quantity register 71 are supplied instead of the first quantity gate signal GS1 and the recurrence coefficient, respectively, to produce the input signal of the second quantity register 72.

In connection with the similarity computer illustrated with reference to FIG. 8, it is easily understood that various modifications are derivable therefrom, such as described in conjunction with the computer for carrying out the method No. 1. Incidentally, the vectors and the recurrence coefficients used on calculating the recurrence formula may be derived from other stages, where the desired variables are stored, or may be read out from the respective memories in response to the address signals supplied from the controller 60.

In further accordance with the present invention, it is possible the skilfully adapt any one of the similarity computers according to this invention to a continuous speech recognition system and to a similar pattern recognition system. For simplicity, the principles of this invention in this regard will be described hereunder with specific reference to the patterns of spoken numerals. Furthermore, it is assumed that a numeral of a plurality of digits is pronounced digit by digit, like, for example, "two oh four nine" for "2049."

For recognition of each digit of a spoken numeral, provision is made of at least ten reference patterns $V^0$, $V^1, \ldots, V^h$, ..., and $V^9$ for "oh," "one," ..., and "nine" and for "double" used, for example, in "double oh," and others. Each reference pattern $V^h$ is represented by a reference sequence of P-dimensional feature vectors, $J_h$ in number. Thus, $$V^h = v_1^h, v_2^h, \ldots, v_j^h, \ldots, \text{ and } v_{J.h}^h,$$

where the suffix $J \cdot h$ represents the double suffix $J_h$. A given pattern for a spoken numeral to be recognized is given by $$U = u_1, u_2, \ldots, u_i, \ldots, \text{ and } u_I,$$

the P-dimensional feature vectors $u_i$'s forming a given-pattern sequence. It should be remembered that the given pattern U consists of a plurality of patterns, each representing a digit of the spoken numeral, unlike the individual reference patterns $V^h$'s. Furthermore, the pattern represented by the first portion of the feature vectors $u_1, u_2, \ldots$, and $u_k$, $k$ in number, of the given-pattern sequence is termed a partial pattern $U^k$.

For recognition of the first digit of a spoken numeral, one of the reference patterns $V^{h1}$ is arbitrarily selected. A plurality of integers $k^1$ variable within a range $$J_{h1} - R \leq k^1 \leq J_{h1} + R \tag{9}$$

are used as the variable length (or the variable number of the vectors) of a first-digit partial pattern $U^{k1}$ (or, more exactly, a sequence representative of a first-digit partial pattern $U^{k1}$). The similarity measures $$S(U^{k1}, V^{h1}) = g(k^1, J_{h1})/(k^1 + J_{h1} - 1) \tag{10}$$

are calculated for the respective lengths $k^1$. If a similarity computer for carrying out the above-mentioned method No. 2 for the modified recurrence formula (7) or (8), such as illustrated with reference to FIG. 8, is available with a slight modification to the normalizing unit 89, the similarity measures for a selected reference pattern are easily obtained without consideration of the individual integers $k^1$, because the recurrence coefficients $g(k^1, J_{h1})$ for all lengths $k^1$ satisfying equation (9) are stored in the first quantity register 71 when the $J_{h1}$-th stage of calculation is completed. In this connection, it should be pointed out that it does not adversely affect the performance of the computer to use a single predetermined integer R for all reference patterns $V^h$'s, although the integer R may be varied in compliance with the length of the selected reference sequence. By the maximum $S(U^{h1}, V^{h1})$ of the measures $S(U^{k1}, V^{h1})$, it is possible to evaluate the similarity between the selected reference pattern $V^{h1}$ and the first-digit partial pattern $U^{h1}$ of a particular length $k^{h1}$. The maximum $S(U^{h1}, V^{h1})$ and the particular length $k^{h1}$ are recorded together with a certain symbol, such as the affix $h_1$, of the selected reference pattern $V^{h1}$. It is therefore preferable that the computer is provided with a register memory or a memory of any form for retaining these data and also the recurrence coefficients $g(k^1, J_{h1})$. Similar maxima $S(U^{t1}, V^{t1})$ are determined and recorded for the reference patterns $V^{t1}$ successively selected from the reference patterns $V^h$'s and the corresponding partial patterns $U^{k1}$, together with the respective particular lengths $k^{t1}$. By the maximum $S(U^{D1}, V^{D1})$ of the maxima, a first-digit definite partial pattern $U^{D1}$ of a first-digit definite length $D^{D1}$ is recognized to be a first-digit definite reference pattern $V^{D1}$. This means that the first digit of the spoken numeral is a number $D_1$. Thus, the segmentation and the recognition of the first digit is simultaneously carried out.

Let a concatinated reference pattern $V^{h1} \cdot V^{h2} \cdot \ldots \cdot V^{hF}$ represent one of the concatinations of the reference patterns $V^h$'s, F in number, or one of the F-permutations with repetitions of the reference patterns $V^h$'s. If the spoken numeral is a numeral of two digits, it is possible by calculating the similarity measures $S_{h1,h2}(U, V^{h1} \cdot V^{h2})$'s between the given pattern U and various two-digit concatinated reference patterns $V^{h1} \cdot V^{h2}$'s and by finding out the maximum $S_{D1,D2}$ to recognize that the respective digits of the spoken numeral and $D_1$ and $D_2$, respectively. It is, however, necessary according to this method to calculate the similarity measures $10\pi 2$ $(=10^2)$ times even when the number of the reference patterns is only 10. For a spoken numeral of F digits, the number of times of calculation amounts to $10\pi F$ $(= 10^F)$ times.

In accordance with the instant invention, the concept of the variable-length partial pattern $U^k$ is combined with successive recognition of the digits. Thus, the first-stage, the second-stage, and the following definite reference patterns $V^{D1}, V^{D2}, \ldots$ are successively determined together with the definite lengths $k^{D1}, k^{D2}, \ldots$ of the partial patterns $U^k$ for the first digit, the first and the second digits, and thus increasing number of digits. The number of times of calculation of the similarity measures is thereby astonishingly reduced to 10F times for a spoken numeral of F digits when 10 reference patterns $V^h$'s are used.

Figure 10:
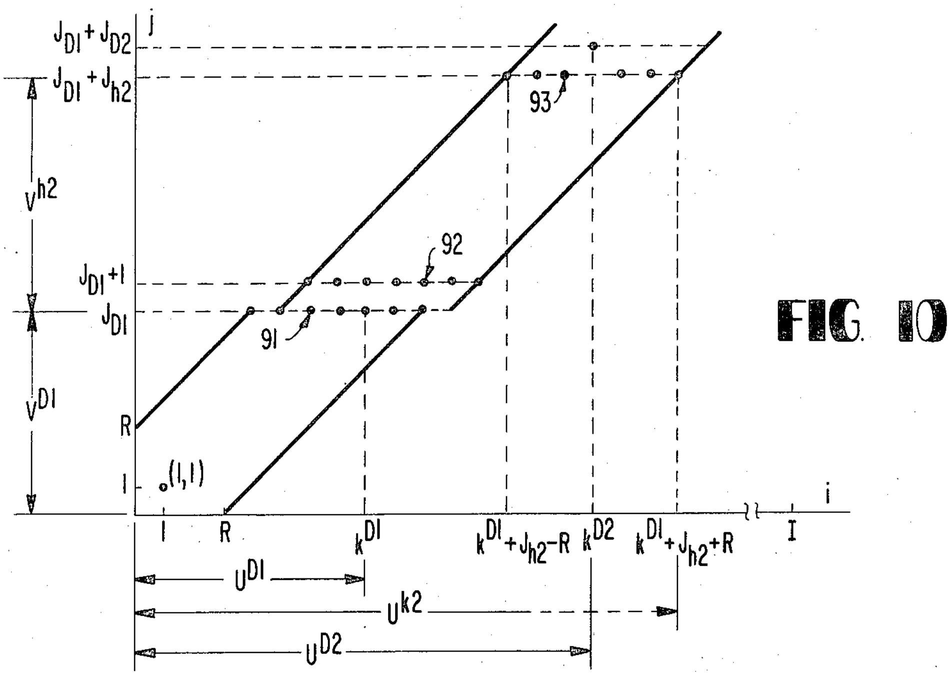
FIG. 10 is a graph for explaining the principles of a pattern recognition system according to this invention.

Referring to FIG. 10 wherein the vector sequences representative of the given pattern U and of a concatinated reference pattern are arranged along the abscissa $i$ and the ordinate $j$, respectively, it is assumed that the first-digit definite partial pattern $U^{D1}$ is recognized to be a first-digit definite reference pattern $V^{D1}$ by means of a similarity computer for the method No. 2 adapted to the pattern recognition according to this invention. The recurrence coefficients $g(k^1, J_{D1})$ for points 91 are stored in the above-mentioned memory, where the abscissae $k^1$ are from $J_{D1} - R$ to $J_{D1} + R$.

For recognition of the second digit, it is therefore possible to calculate the recurrence coefficients $g(k, J_{D1} + 1)$'s for points 92 on the first stage of calculation of the second digit or on the $(J_{D1} + 1)$-th stage as counted from the first stage for the first digit by the use of the retained recurrence coefficients of the $J_{D1}$-th stage of calculation instead of the sufficiently small constants C's used in calculation of the recurrence coefficients for the first stage in general. The first-digit definite length $k^{D1}$, however, may either be equal to $J_{D1} - R$ or $J_{D1} + R$. Consequently, it is preferable in preparation for the calculation for the second digit, to transpose the contents of the buffer register 63 and the second quantity register 72 so that the correlation coefficients $r(k, J_{D1} + 1)$'s may be calculated between the $(J_{D1} + 1)$-th vector of the concatinated reference pattern $V^{D1} \cdot V^{h2} \cdot \ldots$ and the respective vectors of the given pattern U whose suffixes are $k^{D1} - R+1$ through $k^{D1} + R+1$ rather than $J_{D1} - R+1$ through $J_{D1} + R+1$ With one of the reference patterns $V^{h2}$ optionally selected, calculation is carried out up to the recurrence coefficients $g(k^2, J_{D1} + J_{h2})$'s for points 93 on the $(J_{D1} - J_{h2})$-th stage. The maximum $S(U^{D1,h2}, V^{D1} \cdot V^{h2})$ of the similarity measures $$S(U^{K2}, V^{D1} \cdot V^{h2}) = g(k^2, J_{D1} + J_{h2})/(k^2 + J_{D1} + J_{h2} - 1), \quad (11)$$

where $k^2$ is variable within a range $$k^{D1} + J_{h2} - R \leq k^2 \leq k^{D1} + J_{h2} + R, \quad (12)$$

is determined, followed by determination of similar maxima $S(U^{D1,t2}, V^{D1} \cdot V^{t2})$'s. By the maximum $S(U^{D1,D2}, V^{D1} \cdot V^{D2})$ of the maxima, a second definite partial pattern $U^{D1,D2}$ (or in short $U^{D2}$) of a second definite length $k^{D2}$ for the first and the second digits is recognized to be a concatination of the first definite reference pattern $V^{D1}$ and a second definite reference pattern $V^{D2}$. Inasmuch as the recognition is carried out for a second partial pattern $U^{k2}$ having a variable length given by equation (12), correct recognition is possible even though there may be an error of an appreciable amount in determination of the first definite length $k^{D1}$.

The third and the following digits, if any, are successively recognized in the like manner. Incidentally, the last definite length $k^{DF}$ of the last partial pattern $U^{kF}$ for the first through the last digits of an F-digit number should theoretically be equal to the length I.

Figure 11:
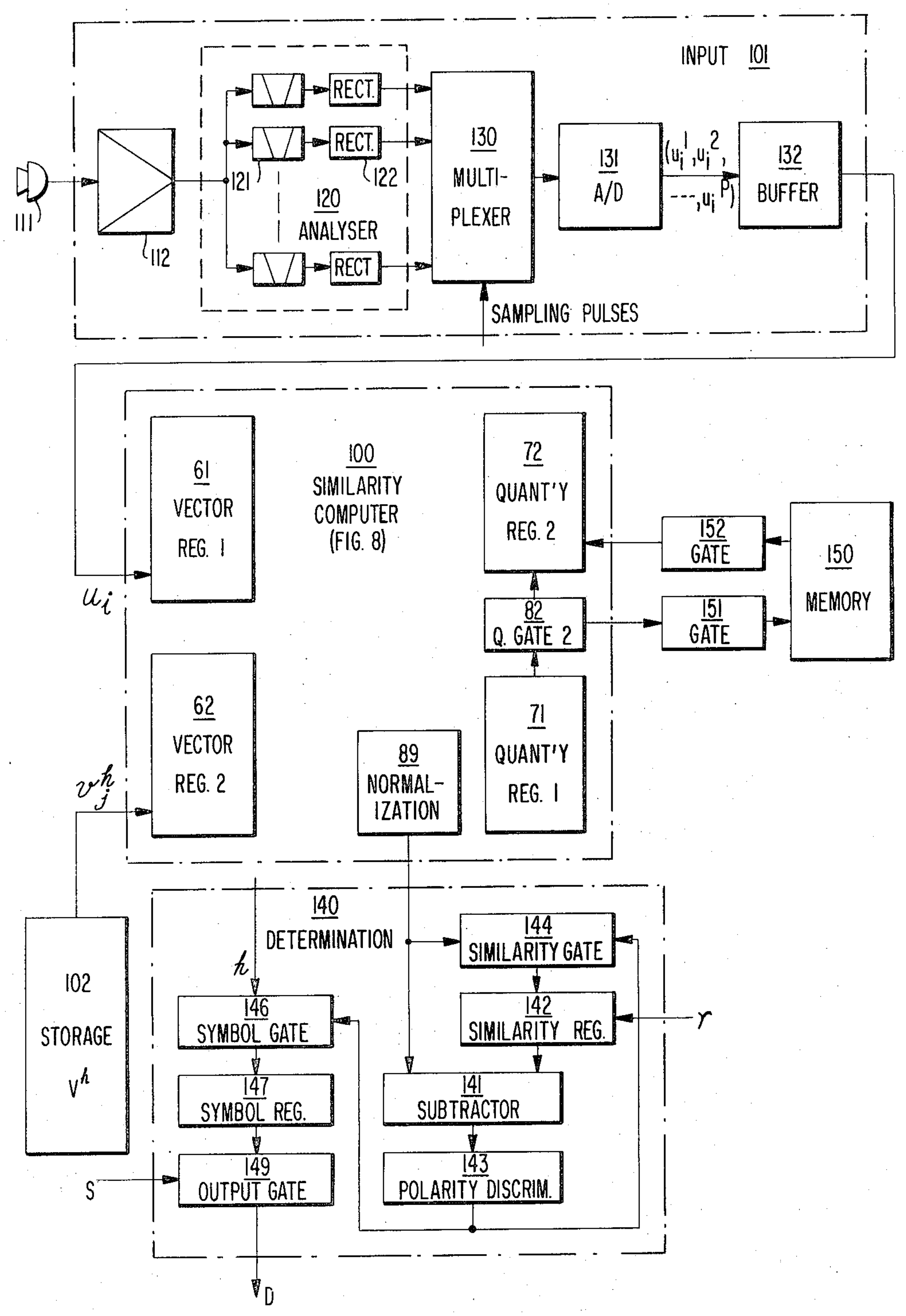
FIG. 11 is a block diagram of a pattern recognition system according to this invention.

Referring to FIG. 11, a continuous speech recognition system according to the present invention comprises a similarity computer 100 for carrying out the above-mentioned method No. 2 for the modified recurrence formula (7) or (8), wherein the first and the second vector shift registers 61 and 62 have sufficient capacities for a portion of a given pattern U possibly covering the pattern for a word and for a reference pattern $V^h$, respectively. The first vector register 61 is supplied from an input unit 101 with the feature vectors representative of at least a portion of the given pattern U.

The reference patterns $V^h$'s are stored in a storage 102, which is controlled by the controller 60 to supply the reference patterns $V^h$'s to the second vector register 62 one by one in accordance with a program. The input unit 101 may comprise a microphone 111, an amplifier 112 therefor, and a P-channel spectrum analyser 120 which in turn comprises band-pass filters 121, P in number, for deriving different frequency bands from the amplified speech sound. The output powers of the band-pass filters 121 are supplied to a plurality of rectifiers with low-pass filters 122, respectively, to become the spectra of the speech sound. The spectra are supplied to a multiplexer 130 to which the sampling pulses are also supplied from the controller 60. The samples of the speech sound picked up at each sampling time point are supplied to an analog-to-digital converter 131 to become a feature vector in the word-parallel form, which is converted into the word-serial form by a buffer 132 and then supplied to the first vector register 61. As soon as a predetermined number of the vectors representative of the first portion of the given pattern U are supplied to the first vector and the buffer registers 61 and 63, the controller 60 reads out a reference pattern $V^h$ stored in the storage 102 at the specified address and places the same in the second vector register 62.

In accordance with equation (10) or (11) or a similar equation, the normalizing unit 89 successively calculates the similarity measures $S(U^k, V^h)$'s for the selected reference pattern $V^h$ and the respective lengths $k$ of the partial pattern $U^k$ given by equation (9) or (12) or a similar equation. These similarity measures may temporarily be stored in a first determination unit (not shown), which determines the maximum $S(U^h, V^h)$ concerned with the selected reference pattern $V^h$ together with the particular length $k^h$. The maxima $S(U^h, V^h)$'s successively determined for every one of the reference patterns $V^h$'s and the particular length $k^h$'s may temporarily be stored in a second determination unit (not shown), which determines the maximum $S(U^D, V^D)$ of the stored maxima together with the definite length $k^D$ and the symbol, such as D, of the definite reference pattern $V^D$.

More preferably, the recognition system comprises a determination unit 140 in turn comprising a determination subtractor 141 supplied with the similarity measures from the normalizing unit 89 and a similarity measure register 142 which supplies the content to the subtractor 141 and is supplied with a sufficiently small constant C by a reset pulse $r$ from the controller 60 before recognition of each word. The signal representative of the difference given by the similarity measure supplied from the normalizing unit 89 minus the content of the register 142 is supplied to a polarity discriminator 143, which produces a gate signal for opening a normally closed similarity measure gate 144 when the difference is positive. When opened, the gate 144 supplies that similarity measure to the register 142, in response to which the gate signal is produced. It follows therefore that the similarity measure which appears for the first time on recognizing a word is stored in the register 142. A similarity measure greater than the previously produced similarity measures is thus retained in the register 142. The gate signal is further supplied to a normally closed symbol gate 146 to open the same for the symbol signal $h$ supplied from the controller 60 in compliance with the address of the selected reference pattern $V^h$. Every time the content of the similarity measure register 142 is renewed, the symbol signal $h$ is supplied to a symbol register 147 through the symbol gate 146. So long as the similarity measures $S(U^k, V^h)$'s for a selected reference pattern $V^h$ are successively produced by the normalizing unit 89, opening of the symbol gate 146 does not change the content of the symbol register 147 in effect. As at least one of the similarity measures for another reference pattern $V^{h'}$ selected by the controller 60 is judged to be greater than the previously produced similarity measures, the content of the symbol register 147 is renewed to another symbol signal $h'$. Thus, the similarity measure between the definite partial pattern $U^D$ and the definite reference pattern $V^D$ as well as the symbol, such as D, of the latter are found in the similarity measure and the symbol registers 142 and 147 when calculation of the similarity measures concerned with a partical pattern $U^k$ of the variable length $k$ and every one of the reference patterns $V^h$'s is completed, when a read-out pulse $s$ is supplied from the controller to an output gate 149 to deliver the symbol signal for the definite reference pattern $V^D$ to a utilization device (not shown), such as an electronic computer for processing the recognized word with reference to the symbol signal. It is now understood that it is possible with the arrangement of this type to reduce the capacity of the registers 142 and 147.

Referring further to FIG. 11, the recognition system further comprises a register memory 150 for storing the recurrence coefficients $g(k, J_h)$'s produced when the calculation for each reference pattern $V^h$ is completed. A memory of the capacity for storing the recurrence coefficients for only one reference pattern suffices with a gate circuit 151 similar to the symbol gate 146 interposed between the first quantity register 71 and the memory 150. When calculation of the similarity measures for a partial pattern $U^k$ and all reference patterns $V^h$'s is completed, the recurrence coefficients for the partial pattern $U_k$ of the lengths $k$'s including the difinite length $k^D$ and the definite concatination of at least one definite reference pattern comprising the just determined definite pattern $V^D$ at the end of the concatination are supplied to the second quantity register 72 through another gate circuit 152 for subsequent use in recognizing the next following word.

A continuous speech recognition system based on the principles of the instant invention has been confirmed in Research Laboratories of Nippon Electric Company, Japan, to have as high a recognition accuracy of 99.9 percent with two hundred reference patterns. It should be noted that the recognition system according to this invention is applicable to recognition of patterns other than the continuous speech patterns with the input unit 101 changed to one suitable therefor and with the related reference patterns preliminarily stored in the storage 102. In addition, it should be understood that the word "vector" is used herein to represent a quantity that is equivalent to a vector in its nature. Although sufficiently small vectors were employed to explain the operation of the arithmetic unit 70, zero vectors may be substituted therefor. In this event, the correlation unit 66 is provided with means for discriminating whether at least one of the vectors is a zero vector or not and means responsive to a zero vector for producing a sufficiently small constant C as the correlation coefficient. Alternatively, the controller 60 is modified to supply, through a connection (not shown), to the output terminal of the correlation unit 66 a sufficiently small constant C when it is understood from the program that a least one of the vectors is a zero vector.

What is claimed is:

1. A computer for calculating the similarity measure between two patterns, each represented by a sequence of feature vectors, based on the quantities representative of the similarity between the feature vectors of the respective sequences, wherein the improvement comprises means for calculating the normalized sum of said quantities, said means comprising means for calculating said quantities in a sequence such that a preceeding quantity is calculated between one of the feature vectors of one of said sequences and one of the feature vectors of the other sequence and the succeeding quantity is calculated between two feature vectors of said respective patterns at least one of which is the next succeeding feature vector from the one in said preceeding quantity and neither of which preceeds in sequence the respective feature vector used to calculate said preceeding quantity.

2. A computer for calculating the similarity measure between two patterns, one represented by a first sequence of successive feature vectors $a_i$ ($i$ =1, 2, . . . , and I), I in number, the other represented by a second sequence of successive feature vectors $b_j$ ($j$ − 1, 2, . . . , and J), J in number, based on the quantities representative of the similarity between said feature vectors of said first sequence and said feature vectors of said second sequence, wherein the improvement comprises means for calculating the extremum normalized sum of the quantities representative of the similarity $m(a_i, b_j)$ between each feature vector $a_s$ ($s$ = each of the integers i) of said first sequence and at least one $t$-th feature vector $b_t$ ($t$ = at least one of the integers $j$) of said second sequence, said means for calculating the extremum normalized sum of the quantities including means for calculating said quantities in the following sequence $m(a_1, b_1) \ldots m(a_{s-1}\ b_x)\ m(a_s\ b_t) \ldots m(a_I\ b_J)$ where $t \geq x$.

3. A computer as claimed in claim 2 wherein said similarity quantities are defined as $r(a_i\ b_j)$ and said means for calculating the extremum normalized sum of the quantities further comprises, recurrence formula calculating means for successively calculating $g(a_i\ b_j)$ for each $r(a_i\ b_j)$, where $g(a_i\ b_j)$ is defined as:

$$g(a_i, b_j) = r(a_i, b_j) + \text{Max}\begin{bmatrix} g(a_{i-1}, b_j) \\ g(a_i, b_{j-1}) \\ g(a_{i-1}, b_{j-1}) + r(a_i, b_j) \end{bmatrix}$$

starting from the initial condition $$g(a_1, b_1) = r(a_1, b_1)$$

and arriving at the ultimate cumulative quantity $g(a_I, b_J)$, and normalizing means for calculating the quotient $$g(a_I, b_J)/(I + J - 1).$$

4. A computer as claimed in claim 2 wherein said similarity quantities are defined as $d(a_i\ b_j)$ and said means for calculating the extremum normalized sum of the quantities further comprises, recurrence formula calculating means for successively calculating $g(a_i\ b_j)$ for each calculation of $d(a_i\ b_j)$, where $g(a_i\ b_j)$ is defined as:

$$g(a_i, b_j) = d(a_i, b_j) + \text{Min}\begin{bmatrix} g(a_{i-1}, b_j) \\ g(a_i, b_{j-1}) \\ g(a_{i-1}, b_{j-1}) + d(a_i, b_j) \end{bmatrix}$$

starting from the initial condition $$g(a_1, b_1) = d(a_1, b_1)$$

and arriving at the ultimate cumulative quantity $g(a_I, b_J)$, and normalizing means for calculating the quotient $$g(a_I, b_J)/(I + J - 1).$$

5. A computer as claimed in claim 2, wherein said means for calculating the extremum normalized sum of the quantities further comprises:

recurrence formula calculating means: for calculating a recurrence formula for a cumulative quantity for the similarity $$g(a_i, b_j) = m(a_i, b_j) + Extremum \text{ [Exterum]} \begin{bmatrix} g(a_{i-1}, b_j) \\ g(a_i, b_{j-1}) \\ g(a_{i-1}, b_{j-1}) + m(a_i, b_j) \end{bmatrix}$$

for those feature vectors $a_i$ and $b_j$ of said sequences whose suffixes satisfy an equality $i + j = n + 1$, where $n$ represents positive integers, from $n = 1$ successively to $n = I + J - 1$, with neglection of that cumulative quantity on deriving the extremum of the three cumulative quantities which is not defined said cumulative quantity being given by the initial condition $$g(a_1, b_1) = m(a_1, b_1)$$

when $n = 1$ and resulting in the ultimate cumulative quantity $g(a_I, b_J)$ when $n = I + J - 1$, and normalizing means for calculating the quotient $$g(a_I, b_J)/(I + J - 1).$$

6. A computer as claimed in claim 2, wherein said means for calculating the extremum normalized sum of the quantities further comprises:

recurrence formula calculating means for calculating a recurrence formula for a cumulative quantity for the similarity $$g(a_i, b_j) = m(a_i, b_j) + \text{Extremum} \begin{bmatrix} g(a_{i-1}, b_j) \\ g(a_i, b_{j-1}) \\ g(a_{i-1}, b_{j-1}) + m(a_i, b_j) \end{bmatrix}$$

for those feature vectors $a_i$ and $b_j$ of said sequences whose suffixes satisfy an equality $$j = n,$$

where $n$ represents positive integers, from $n = 1$ successively to $n = J$, with neglection of that cumulative quantity on deriving the extremum of the three cumulative quantities which is not defined, said cumulative quantity being given by the initial condition $$g(a_1, b_1) = m(a_1, b_1)$$

when $n = 1$ and resulting in the ultimate cumulative quantity $g(a_I, b_J)$ when $n = J$, and normalizing means for calculating the quotient $$g(a_I, b_J)/ (I + J - 1).$$

7. A computer as claimed in claim 6, wherein said recurrence formula calculating means comprises first and second vector shift register means having a plurality of stages for storing the feature vectors of said first and said second sequences, respectively, buffer register means having a plurality of stages responsive to the content of a predetermined stage of said first vector register means for storing the feature vectors of said first sequence, a first and a second quantity shift register having a plurality of stages for storing the cumulative quantities $g(a, b, )$, a calculator responsive to the contents of the respective preselected stages of said buffer and said second vector register means for producing the quantity $m(a, b)$ representative of the similarity between the last-mentioned contents, a first adder responsive to the content of a first predetermined stage of said second quantity register and the quantity produced by said first adder for producing the sum of the last-mentioned content and quantity, a selector responsive to the contents of a predetermined stage of said first quantity register and of a second predetermined stage of said second quantity register and said sum for producing the extremum of the last-mentioned contents and said similarity quantity, a second adder responsive to said sum and said extremum for producing the cumulative quantity for the contents of said respective preselected stages of said vector register means, vector shift means for successively shifting the contents of said first and said second vector register means to place a prescribed feature vector of said second sequence having a prescribed suffix in said preselected stage of said second vector register means following the feature vector having a preceding suffix equal to said prescribed suffix minus one, buffer shift means for cyclically shifting the contents of said buffer register means to place, while said prescribed vector is placed in said preselected stage, the feature vectors of said first sequence in said preselected stage of said buffer register means from the feature vector having a first suffix equal to said prescribed suffix minus a predetermined integer successively to the feature vector having a second suffix equal to said first suffix plus twice said predetermined integer, said vector shift means placing the feature vector having a suffix equal to said second suffix in said predetermined stage of said first vector register means while said prescribed vector is placed in said preselected stage, said buffer shift means placing the vector with said second suffix placed in said predetermined stage of said first vector register means in said buffer register means next succeeding the feature vector having a third suffix equal to said second suffix minus one at the latest before the vector with said third suffix is shifted from said preselected stage of said buffer register means, quantity shift means for successively shifting the contents of said quantity registers substantially simultaneously with the cyclic shift of the contents in said buffer register means, write-in means for writing the cumulative quantities successively produced by said second adder in the respective stages of said first quantity register, and transfer means for transferring the contents of said first quantity register to said second quantity register in timed relation to the shift of the contents of each said vector register means by one feature vector, said quantity shift means placing, when the feature vector having a fourth suffix is placed in said preselected stage of said buffer register means, the cumulative quantities produced for the feature vector having a suffix equal to said fourth suffix minus one and said prescribed vector, for the vectors having said fourth suffix and said preceding suffix, respectively, and for the feature vectors having a suffix equal to said fourth suffix minus one and said preceding suffix, respectively, in said predetermined stage of said first quantity register and in said second and said first predetermined stages of said second quantity register, respectively.

8. A system for recognizing a given pattern represented by a given-pattern sequence of feature vectors with reference to a predetermined number of reference patterns, each represented by a reference sequence of feature vectors, said system having means for successively selecting every one of said reference sequences, means for calculating the similarity measure between said given pattern and the reference pattern represented by the selected reference sequence based on the quantities representative of the similarity between the feature vectors of said given-pattern sequence and those of the selected reference sequence, and means for finding out the maximum of the similarity measures calculated for all of said reference sequences thereby recognizing said given pattern to be that one of said reference patterns for which the similarity measure is the maximum, wherein the improvement comprises means in said calculating means for calculating the normalized sum of said quantities, each said quantity being calculated between one of the feature vectors of said given-pattern sequence and one of the feature vectors of the selected reference sequence followed by the quantity representative of the similarity between those two feature vectors in the respective last-mentioned sequences, both of which are not placed in the respective last-mentioned sequences preceding said ones of the feature vectors, respectively, and at least one of which is placed in the sequence next succeeding said one of the feature vectors.

9. A system for recognizing a given pattern represented by a given-pattern sequence of feature vectors with reference to a predetermined number of reference patterns, each represented by a reference sequence of feature vectors, said system having means for successively selecting every one of said reference sequences, means for calculating the similarity measure between said given pattern and the reference pattern represented by the selected reference sequence based on the quantities representative of the similarity between the feature vectors of said given-pattern sequence and those of the selected reference sequence, and means for finding out the maximum of the similarity measures calculated for all of said reference sequences thereby recognizing said given pattern to be that one of said reference patterns for which the similarity measure is the maximum, wherein the improvement comprises:

first means in said calculating means for finding out the extremum normalized sum of the quantities representative of the similarity between each of the feature vectors of the selected reference sequence and at least one of the feature vectors of said given-pattern sequence up to the quantity for the last feature vector of said selected reference sequence and each of a plurality of $k$-th feature vectors of said given-pattern sequence, the number $k$ satisfying $$J - R \le k \le J + R,$$

where J and R are predetermined integers, respectively, and second means in said maximum finding means for finding out the extremum of the extremum normalized sums found for all of said numbers $k$ and for all of said reference sequences, whereby said given pattern is recognized to comprise that one of said reference patterns for which the last-mentioned extremum is found.

10. A system for recognizing a given pattern U represented by a given-pattern sequence of successive feature vectors $u_i$ ($i = 1, 2, \ldots,$ and I), I in number, with reference to a predetermined number T of reference patterns $V^t$ ($t = 1, 2, \ldots,$ and T), each said reference pattern $V^h$ ($h$ = each of the integers $t$) being represented by a reference sequence of successive feature vectors $v_j^h$ ($j = 1, 2, \ldots,$ and $J_h$), $J_h$ in number, said system having means for successively selecting every one of said reference sequences, means for calculating the similarity measure between said given pattern and the reference pattern represented by the selected reference sequence based on the quantities representative of the similarity between the feature vectors of said given-pattern sequence and those of the selected reference sequence, and means for finding out the maximum of the similarity measures calculated for all of said reference sequences thereby recognizing said given pattern to be that one of said reference patterns for which the similarity measure is the maximum, wherein the improvement comprises:

first means in said maximum finding means for recognizing an $f$-th definite portion of said given pattern ($f$ = each of positive integers) represented by the successive feature vectors including the first feature vector $u_1$ of said given-pattern sequence to be a definite $f$-permutation with repetitions of the reference patterns $V^{D1} \cdot \ldots \cdot V^{D(f-1)} \cdot V^{Df}$, the number $f$ being at least one, said permutation being a definite concatination of a first through an $(f-1)$-th definite reference sequence and an $f$-th definite reference sequence, and second means in said calculating means for finding out the extremum normalized sum of the quantities representative of the similarity between each of the feature vectors of a partly definite concatination of said first through said $(f-1)$-th definite reference sequences plus a reference sequence selected as the $f$-th possible reference sequence of said partly definite concatination and at least one feature vector of said given-pattern sequence up to the quantity for the last feature vector $v_{[J(hf)]}^{(hf)}$ of said $f$-th possible reference sequence and each of a plurality of $k$-th feature vectors of said given-pattern sequence, the numbers $k$ satisfying $$k^{D(f-1)} + J_{(hf)} - R \le k \le k^{D(f-1)} + J_{(hf)} + R,$$

where $k^{D(f-1)}$ is the number of the feature vectors of a concatination of said first through said $(f-1)$-th definite reference sequences, said first means comprising means for finding out the extremum of the extremum normalized sums found for all of said numbers $k$ and for all of said reference sequences successively selected as said $f$-th possible reference sequence, thereby recognizing that one of said all of said reference sequences to be said $f$-th definite reference sequence for which the last-mentioned extremum is found.

11. A system as claimed in claim 10, wherein said second means comprises:

means for calculating a recurrence formula for a cumulative quantity for the similarity $$g(\mu_i, \nu_j) = m(\mu_i, \nu_j) + \text{Extremum}\begin{bmatrix} g(\mu_{i-1}, \nu_j) \\ g(\mu_i, \nu_{j-1}) \\ g(\mu_{i-1}, \nu_{j-1}) + m(\mu_i, \nu_j) \end{bmatrix},$$

where $v_j$ represents the feature vectors of said first through said $(f-1)$-th definite and said $f$-th possible reference sequences and $m(u_i, v_j)$ represents the quantities representative of the similarity between the feature vectors $u_i$ and $v_j$ whose suffixes $i$ and $j$ satisfy an equality $j = n$,
where $n$ represents positive integers, successively from $n = 1$ with neglection of that cumulative quantity on deriving the extremum of the three cumulative quantities which is not defined, said cumulative quantity being given by the initial condition $$g(u_1, v_1) = m(u_1, v_1)$$

when $n = 1$ and resulting in a plurality of $f$-th ultimate cumulative quantities $g(u_k, v_{[}J(hf)_1{}^{(hf)})$ when $$n = J(D_1 + \ldots + J_{[D(f-1)]} + {}_{J(hf)}$$

and
means for calculating the $f$-th quotients $$g(M_K, V_{J(hf)}{}^{(hf)}/(k + J_{(D1)} + \ldots + J_{[D(f-1)]} + {}_{J(hf)} - 1),$$

said means comprised in said first means finding out the extremum of said $f$-th quotients calculated for said all of said numbers $k$ and said all of said reference sequences.

12. A computer as claimed in claim 2 wherein each quantity calculated, $m(a_i, b_j)$ satisfies the following condition, $$i - R \leq j \leq i + R,$$

where R is a predetermined integer smaller than both I and J.

13. A computer as claimed in claim 3 wherein $r(a_i, b_i)$ is defined as:

$$r(a_i, b_j) = \frac{(a_i b_j)}{\sqrt{(a_i a_i)(b_j b_j)}},$$

where the parentheses on the right of the above equation symbolizes the scalar product of the two vectors in the parenthesis.

14. A computer as claimed in claim 4 wherein:

$$d(a_i\, b_j) = |a_i - b_j|\,.$$

15. A computer as claimed in claim 5 wherein:

$$m(a_i b_j) = \frac{(a_i b_j)}{\sqrt{(a_i a_i)(b_j b_j)}},$$

where the parenthetical symbol on the right side of the above equation symbolizes the scalar product of the two vectors within the parenthesis, and further
wherein the Extremum in the recurrence formula is the Maximum.

16. A computer as claimed in claim 5 wherein:

$$m(a_i\, b_j) = |\, a_i - b_j|,$$

and the Extremum in the recurrence formula is the Minimum.

17. A computer as claimed in claim 6 wherein:

$$m(a_i b_j) = \frac{(a_i b_j)}{\sqrt{(a_i a_i)(b_j b_j)}},$$

where the parenthetical symbol on the right side of the above equation symbolizes the scalar product of the two vectors within the parenthesis, and further
wherein the Extremum in the recurrence formula is the Maximum.

18. A computer as claimed in claim 6 wherein:

$$m(a_i\, b_j) = |\, a_i - b_j\,|\,,$$

and the Extremum in the recurrence formula is the Minimum.

19. A computer as claimed in claim 2 wherein said similarity quantities are defined as $r(a_i\, b_j)$ and said means for calculating the extremum normalized sum of the quantities further comprises,
recurrence formula calculating means for successively calculating $g(a_i\, b_j)$ for each $r(a_i\, b_j)$, where $g(a_i\, b_j)$ is defined as:

$$g(a_i, b_j) = r(a_i, b_j) + \text{Max}\begin{bmatrix} g(a_{i-1}, b_j) \\ g(a_i, b_{j-1}) \end{bmatrix}$$

starting from the initial condition $$g(a_1, b_1) = r(a_1, b_1)$$

and arriving at the ultimate cumulative quantity $g(a_I, b_J)$, and normalizing means for calculating the quotient $$g(a_I, b_J)\, /\, (I + J - 1).$$

20. A computer as claimed in claim 2 wherein said similarity quantities are defined as $d(a_i\, b_j)$ and said means for calculating the extremum normalized sum of the quantities further comprises,
recurrence formula calculating means for successively calculating $g(a_i\, b_j)$ for each calculation of $d(a_i\, b_j)$, where $g(a_i\, b_j)$ is defined as:

$$g(a_i, b_j) = d(a_i, b_j) + \text{Min}\begin{bmatrix} g(a_{i-1}, b_j) \\ g(a_i, b_{j-1}) \end{bmatrix}$$

starting from the initial condition $$g(a_1, b_1) = d(a_1, b_1)$$

and arriving at the ultimate cumulative quantity $g(a_I, b_J)$, and
normalizing means for calculating the quotient $$g(a_I, b_J)\, /\, (I + J - 1).$$

21. A computer as claimed in claim 2, wherein said means for calculating the extremum normalized sum of the quantities further comprises:
recurrence formula calculating means for calculating a recurrence formula for a cumulative quantity for the similarity $$g(a_i, b_j) = m(a_i, b_j) + \text{Extremum}\begin{bmatrix} g(a_{i-1}, b_j) \\ g(a_i, b_{j-1}) \end{bmatrix}$$

extremum by
for those feature vectors $a_i$ and $b_j$ of said sequences whose suffixes satisfy an equality $$i + j = n + 1,$$

where $n$ represents positive integers, from $n = 1$ successively to $n = I + J - 1$, with neglection of that cumulative quantity on deriving the extremum of the three cumulative quantities which is not defined, said cumulative quantity being given by the initial condition $$g(a_1, b_1) = m(a_1, b_1)$$

when $n = 1$ and resulting in the ultimate cumulative quantity $g(a_I, b_J)$ when $n = I + J - 1$, and normalizing means for calculating the quotient $$g(a_I, b_J) \,/\, (I + J - 1).$$

22. A computer as claimed in claim 2, wherein said means for calculating the extremum normalized sum of the quantities further comprises:

recurrence formula calculating means for calculating a recurrence formula for a cumulative quantity for the similarity $$g(a_i,b_j) = m(a_i,b_j) + \text{Extremum}\begin{bmatrix} g(a_{i-1},b_j) \\ g(a_i,b_{j-1}) \end{bmatrix}$$

for those feature vectors $a_i$ and $b_j$ of said sequences whose suffixes satisfy an equality $$j = n,$$

where $n$ represents positive integers, from $n = 1$ successively to $n = J$, with neglection of that cumulative quantity on deriving the extremum of the three cumulative quantities which is not defined, said cumulative quantity being given by the initial condition $$g(a_1, b_1) = m(a_1, b_1)$$

when $n = 1$ and resulting in the ultimate cumulative quantity $g(a_I, b_J)$ when $n = J$, and normalizing means for calculating the quotient $$g(a_I, b_J) \,/\, (I + J - 1).$$

23. A system as claimed in claim 10, wherein said second means comprises:

means for calculating a recurrence formula for a cumulative quantity for the similarity $$g(\mu_i,\nu_j) = m(\mu_i,\nu_j) + \text{Extremum}\begin{bmatrix} g(\mu_{i-1},\nu_j) \\ g(\mu_i,\nu_{j-1}) \end{bmatrix}$$

where $v_j$ reresents the feature vectors of said first through said $(f-1)$-th definite and said $f$-th possible reference sequences and $m(u_i, v_j)$ represents the quantities representative of the similarity between the feature vectors $u_i$ and $v_j$ whose suffixes $i$ and $j$ satisfy an equality $$j = n,$$

where $n$ represents positive integers, successively from $n = 1$ with neglection of that cumulative quantity on deriving the extremum of the three cumulative quantities which is not defined, said cumulative quantity being given by the initial condition $$g(u_1, v_1) = m(u_1, v_1)$$

when $n = 1$ and resulting in a plurality of $f$-th ultimate cumulative quantities $g(u_k, v_{[J(hf)]}^{(hf)})$ when $$n = J_{(D1)} + \ldots + J_{[D(f-1)]} + J_{(hf)}$$

and means for calculating the $f$-th quotients $$g(u_k, v_{J(hf)}^{(hf)}) \,/\, (k + J_{(D1)} + \ldots + J_{[D(f-1)]} + J_{(hf)} - 1),$$

said means comprised in said first means finding out the extremum of said $f$-th quotients calculated for said all of said numbers $k$ and said all of said reference sequences.

* * * * *

UNITED STATES PATENT OFFICE
CERTIFICATE OF CORRECTION

Patent No. 3,816,722 Dated June 11, 1974

Inventor(s) Hiroaki SAKOE et al

It is certified that error appears in the above-identified patent and that said Letters Patent are hereby corrected as shown below:

IN THE SPECIFICATION:

Column 1, line 47 - delete "speaking person" and insert -- speaker --

Column 7, line 14 - delete "members" and insert -- numbers --

Column 8, line 38 - delete "i· s and j· s" and insert -- i. s and j. s -- line 43 - delete "$g(C_{n-}1^2)$" and insert -- $g(C_{n-1}^2)$ -- line 48 - delete "ficients" and insert -- ficient -- line 59 - delete "$g(Cn-2^m)$" and insert -- $g(C_{n-2}^m)$ --

Column 9, line 54 - delete "$a_i^{p\cdot}b_j^p$" and insert -- $a_i^p.b_j^p$ --

Column 10, line 26 - delete "$a_i^{p\cdot}\ b_j^{p'}$ s" and insert -- $a_i^p.b_j^p$'s --

Column 13, line 5 - delete "$g(C_i^{r+2})$" and insert -- $g(C_i^{R+2})$ --

Column 17, line 17 - after "possible" delete "the" and insert -- to -- line 17 - delete "skilfully" and insert -- skillfully -- line 35 - delete "J·h" and insert -- J.h --

Column 18, line 26 - delete "$D^{D1}$" and insert -- $k^{D1}$ --

Column 19, line 2 - delete "$J_{D1}-R$ to $JD1+R$" and insert -- $J_{D1}-R$ to $J_{D1}+R$ -- line 21 - after "$J_{D1}+R+1$" insert -- . --

FORM PO-1050 (10-69)

USCOMM-DC 60376-P69
★ U.S. GOVERNMENT PRINTING OFFICE : 1969 O—366-334.

UNITED STATES PATENT OFFICE
CERTIFICATE OF CORRECTION

Patent No. 3,816,722 Dated June 11, 1974

Inventor(s) Hiroaki SAKOE et al

It is certified that error appears in the above-identified patent and that said Letters Patent are hereby corrected as shown below:

Column 19, line 24 - delete "$(J_{D1} - J_{h2})$-th" and insert -- $(J_{D1} + J_{h2})$-th --

Column 21, line 36 - delete "$U_k$" and insert -- $U^k$ -- line 36 - delete "difi-" and insert -- defi- --

IN THE CLAIMS:

Column 23, line 10 - after "means" delete ":"

line 14 - delete "[Exterum]"

line 24 - after "defined" insert -- , --

Column 24, line 2 - delete "g(a,b,)" and insert -- g(a,b) -- line 15 - after "said" delete "similarity quantity" and insert -- sume -- line 16 - after "said" delete "sum" and insert -- similarity quantity --

Column 26, line 43 - delete "$v_{[J\ (hf)]}^{(hf)}$" and insert -- $v[J_{(hf)}]^{(hf)}$ --

Column 27, line 15 - delete "$v_{[J(hf)]}^{(hf)}$" and insert -- $v_{[J_{(hf)}]}^{(hf)}$ -- line 17 - delete "$h = J(D_1 + \ldots + J_{[D(f-1)]} + J(hf)$" and insert -- $n = J_{(D_1)} + \ldots + J_{[D_{(f-1)}]} + J_{(hf)}$ -- line 21 - delete entire line and insert -- $g(U_k, V_{J_{(hf)}}^{(hf)}) / (k + J_{(D_1)} + \ldots + J_{[D(f-1)]} + J_{(hf)} - 1)$ --

USCOMM-DC 60376-P69
☆ U.S. GOVERNMENT PRINTING OFFICE : 1969 O—366-334.

UNITED STATES PATENT OFFICE

CERTIFICATE OF CORRECTION

Patent No. 3,816,722 Dated June 11, 1974

Inventor(s) Hiroaki SAKOE et al

It is certified that error appears in the above-identified patent and that said Letters Patent are hereby corrected as shown below:

Column 27, lines 33-34 - delete "$r(a_i, b_i)$" and insert -- $r(a_i, b_j)$ --

Column 30, line 23 - delete "$v_{[J(hf)]}^{(hf)}$" and insert -- $v_{[J_{(hf)}]}^{(hf)}$ -- line 25 - delete entire line and insert -- $n + J_{(D_1)} + \cdots + J_{[D_{(f-1)}]} + J_{(hf)}$ -- line 29 - delete entire line and insert -- $g(u_k, v_{J_{(hf)}}^{(hf)}) / (k + J_{(D_1)} + \cdots + J_{[D_{(f-1)}]} + J_{(hf)} - 1)$ Signed and sealed this 10th day of December 1974.

(SEAL)
Attest:

McCOY M. GIBSON JR.
Attesting Officer

C. MARSHALL DANN
Commissioner of Patents

USCOMM-DC 60376-P69
☆ U.S. GOVERNMENT PRINTING OFFICE : 1969 O—366-334.